United States Patent
Yoshioka et al.

(10) Patent No.: US 8,065,072 B2
(45) Date of Patent: Nov. 22, 2011

(54) TRANSIT INFORMATION PROVISION DEVICE, METHOD AND PROGRAM

(75) Inventors: Mototaka Yoshioka, Osaka (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 1082 days.

(21) Appl. No.: 11/910,854

(22) PCT Filed: Mar. 22, 2007

(86) PCT No.: PCT/JP2007/055810
§ 371 (c)(1),
(2), (4) Date: Oct. 5, 2007

(87) PCT Pub. No.: WO2007/132593
PCT Pub. Date: Nov. 22, 2007

(65) Prior Publication Data
US 2009/0281721 A1    Nov. 12, 2009

(30) Foreign Application Priority Data

May 16, 2006 (JP) ................. 2006-136956

(51) Int. Cl.
| | |
|---|---|
| G01C 21/00 | (2006.01) |
| G08G 1/0968 | (2006.01) |
| G08G 1/0969 | (2006.01) |
| G08G 1/09 | (2006.01) |
| G08G 1/0962 | (2006.01) |

(52) U.S. Cl. ......... 701/117; 701/26; 701/119; 701/210; 701/213

(58) Field of Classification Search .............. 701/23, 701/25–26, 117–119, 201–202, 207, 209–210, 701/213, 224
See application file for complete search history.

(56) References Cited

U.S. PATENT DOCUMENTS 5,504,482 A * 4/1996 Schreder ............... 340/995.13
6,259,377 B1 * 7/2001 Noecker et al. ........... 340/933
(Continued)

FOREIGN PATENT DOCUMENTS

JP        2003-4469        1/2003
(Continued)

OTHER PUBLICATIONS

International Search Report issued Jun. 26, 2007 in the International (PCT) Application of which the present application is the U.S. National Stage.

*Primary Examiner* — Khoi Tran
*Assistant Examiner* — Dale Moyer
(74) *Attorney, Agent, or Firm* — Wenderoth, Lind & Ponack, L.L.P.

(57) ABSTRACT

A transit information provision device includes a transit event information acquiring unit which acquires transit event information; a transit information provision unit which provides the transit information to a user; a position information extraction unit which successively extracts position information which indicates a present position of the user; a route acceptance unit which accepts an anticipated movement route for the user; a detour traveling judgment unit which judges whether or not the user has traveled along the anticipated movement route; and a transit information provision rule calculation unit operable to calculate a rule for providing the transit information using transit event information when it is judged, by the detour traveling judgment unit that the user has traveled along the anticipated movement route, and transit event information when the user is judged to have detoured by the detour traveling judgment unit.

9 Claims, 36 Drawing Sheets

U.S. PATENT DOCUMENTS

| | | | |
|---|---|---|---|
| 6,968,272 B2 * | 11/2005 | Knockeart et al. | 701/210 |
| 7,818,121 B2 * | 10/2010 | Uyeki et al. | 701/210 |
| 2003/0093217 A1 * | 5/2003 | Petzold et al. | 701/201 |
| 2004/0015291 A1 * | 1/2004 | Petzold et al. | 701/202 |
| 2005/0222763 A1 * | 10/2005 | Uyeki | 701/210 |
| 2007/0112503 A1 * | 5/2007 | Johnson et al. | 701/117 |
| 2009/0303078 A1 * | 12/2009 | Mochizuki et al. | 340/901 |

FOREIGN PATENT DOCUMENTS

| | | |
|---|---|---|
| JP | 2004-77360 | 3/2004 |
| JP | 2006-53132 | 2/2006 |
| JP | 2007-71814 | 3/2007 |

* cited by examiner

FIG. 3

| Traffic ID | Traffic point | Traffic level | Traffic distance | Traffic time |
|---|---|---|---|---|
| 001 | N24→N25 | 2(Congested) | 1km | 10 minutes |
| 002 | N23→N24 | 0(Normal) | 0km | 0 minutes |
| .. | .. | .. | .. | .. |
| 010 | N37→N36 | 1(Slow) | 1km | 5 minutes |
| 011 | N33→N32→N31 | 2(Congested) | 2km | 20 minutes |
| .. | .. | .. | .. | .. |

FIG. 6

| Date and Time | East longitude | North latitude |
|---|---|---|
| September 20th, 2005 7:45 | 135 degrees 13 minutes 10 seconds | 34 degrees 24 minutes 15 seconds |
| September 20th, 2005 7:46 | 135 degrees 13 minutes 14 seconds | 34 degrees 24 minutes 25 seconds |
| September 20th, 2005 7:47 | 135 degrees 13 minutes 24 seconds | 34 degrees 24 minutes 41 seconds |
| September 20th, 2005 7:48 | 135 degrees 13 minutes 46 seconds | 34 degrees 23 minutes 01 seconds |
| September 20th, 2005 7:49 | 135 degrees 14 minutes 04 seconds | 34 degrees 22 minutes 08 seconds |
| September 20th, 2005 7:50 | 135 degrees 15 minutes 24 seconds | 34 degrees 22 minutes 14 seconds |
| ... | ... | ... |
| ... | ... | ... |
| September 20th, 2005 8:10 | 135 degrees 28 minutes 41 seconds | 34 degrees 19 minutes 30 seconds |
| ... | ... | ... |
| ... | ... | ... |

Longitude/latitude information for N100 (House)

Longitude/latitude information for N21 (Green 4 intersection)

Longitude/latitude information for N26 (Flower 2 intersection)

| Movement history ID | Departure point | Route | | | | | | | Destination |
|---|---|---|---|---|---|---|---|---|---|
| 001 | N100 (House) | N21 (Green 4) | N22 (Green 3) | N23 (Green 2) | N28 (Flower 4) | N27 (Flower 3) | N26 (Flower 2) | ... | N51 (Flower Town Corporation) |
| | 7:45 | 7:50 | 7:53 | 7:58 | 8:02 | 8:07 | 8:10 | ... | 8:25 |
| ... | ... | ... | ... | ... | ... | ... | ... | ... | ... |
| ... | ... | ... | ... | ... | ... | ... | ... | ... | ... |

| Movement history ID | Departure point | Route | | | | | | | Destination |
|---|---|---|---|---|---|---|---|---|---|
| | | N21 (Green 4) | N22 (Green 3) | N23 (Green 2) | N24 (Green 1) | N25 (Flower 1) | N26 (Flower 2) | ... | N51 (Flower Town Corporation) |
| 010 | N100 (House) | | | | | | | | |
| | 7:35 | 7:40 | 7:43 | 7:47 | 7:50 | 7:55 | 8:08 | ... | 8:18 |
| | ... | ... | ... | ... | ... | ... | ... | ... | ... |
| ... | ... | ... | ... | ... | ... | ... | ... | ... | ... |

FIG. 15

| Traffic ID | Traffic point | Traffic distance | Traffic time | Provision format |
|---|---|---|---|---|
| 001 | N24→N25 | 1km | 10 minutes | Screen display |
| .. | .. | .. | .. | .. |

FIG. 17

| Traffic ID | Traffic point | Traffic distance | Traffic time | Traffic level | Provision format | Detourable? |
|---|---|---|---|---|---|---|
| 001 | N24→N25 | 1km | 10 minutes | 2 (Congested) | Screen display | ○ |
| .. | .. | | | .. | | |

FIG. 18

| Traffic ID | Traffic point | Traffic distance | Traffic time | Traffic level | Provision format | Detourable? |
|---|---|---|---|---|---|---|
| 010 | N24→N25 | 500m | 5 minutes | 2(Congested) | Screen display | × |
| .. | .. | | | .. | | |

FIG. 19(a)

| Accepted route ID | Departure point | Route | | | | | | Destination |
|---|---|---|---|---|---|---|---|---|
| | N100 (House) | N21 (Green 4) | N22 (Green 3) | N23 (Green 2) | N24 (Green 1) | N25 (Flower 1) | N26 (Flower 2) | ... | N51 (Flower Town Corporation) |

FIG. 19(b)

| Movement history ID | Departure point | Route | | | | | | | Destination |
|---|---|---|---|---|---|---|---|---|---|
| 001 | N100 (House) | N21 (Green 4) | N22 (Green 3) | N23 (Green 2) | N28 (Flower 4) | N27 (Flower 3) | N26 (Flower 2) | ... | N51 (Flower Town Corporation) |
| | 7:45 | 7:50 | 7:53 | 7:58 | 8:02 | 8:07 | 8:10 | ... | 8:25 |

FIG. 19(c)

| Traffic ID | Traffic point | Traffic distance | Traffic time | Traffic level | Provision format | Detourable? | Detour history |
|---|---|---|---|---|---|---|---|
| 001 | N24→N25 | 1km | 10 minutes | 2(Congested) | Screen display | ○ | ○ |
| ... | | | | ... | | | |

FIG. 20(a)

| Accepted route ID | Departure point | Route | | | | | | | Destination |
|---|---|---|---|---|---|---|---|---|---|
| | N100 (House) | N21 (Green 4) | N22 (Green 3) | N23 (Green 2) | N24 (Green 1) | N25 (Flower 1) | N26 (Flower 2) | ... | N51 (Flower Town Corporation) |

FIG. 20(b)

| Movement history ID | Departure point | Route | | | | | | | Destination |
|---|---|---|---|---|---|---|---|---|---|
| 010 | N100 (House) | N21 (Green 4) | N22 (Green 3) | N23 (Green 2) | N24 (Green 1) | N25 (Flower 1) | N26 (Flower 2) | ... | N51 (Flower Town Corporation) |
| | 7:35 | 7:40 | 7:43 | 7:47 | 7:50 | 7:55 | 8:00 | ... | 8:04 |

FIG. 20(c)

| Traffic ID | Traffic point | Traffic distance | Traffic time | Traffic level | Provision format | Detourable? | Detour history |
|---|---|---|---|---|---|---|---|
| 010 | N24→N25 | 500m | 5 minutes | 1(Slow) | Screen display | ○ | × |
| ... | | | | | | | |

FIG. 21

| Traffic ID | Traffic point | Traffic distance | Traffic time | Traffic level | Provision format | Detourable? | Detour history |
|---|---|---|---|---|---|---|---|
| 001 | N24→N25 | 1km | 10 minutes | 2(Congested) | Screen display | ○ | ○ |
| 007 | N41→N42 | 2km | 12 minutes | 2(Congested) | Screen display | ○ | ○ |
| 015 | N44→N45 | 2km | 10 minutes | 2(Congested) | Screen display | ○ | ○ |
| 018 | N60→N61 | 3km | 10 minutes | 2(Congested) | Screen display | ○ | ○ |
| 019 | N65→N66 | 2km | 11 minutes | 2(Congested) | Screen display | ○ | ○ |
| 020 | N70→N71 | 1km | 8 minutes | 2(Congested) | Screen display | ○ | ○ |
| 021 | N73→N74 | 1km | 9 minutes | 2(Congested) | Screen display | ○ | ○ |
| 010 | N24→N25 | 1km | 5 minutes | 1(Slow) | Screen display | ○ | × |
| 011 | N42→N43 | 1km | 3 minutes | 1(Slow) | Screen display | ○ | × |
| 012 | N49→N53 | 1km | 3 minutes | 1(Slow) | Screen display | ○ | × |
| 016 | N50→N51 | 1km | 4 minutes | 1(Slow) | Screen display | ○ | × |
| 017 | N65→N66 | 1km | 5 minutes | 2(Congested) | Screen display | ○ | × |
| 022 | N72→N77 | 1km | 4 minutes | 1(Slow) | Screen display | ○ | × |
| 023 | N78→N79 | 1km | 4 minutes | 1(Slow) | Screen display | ○ | × |

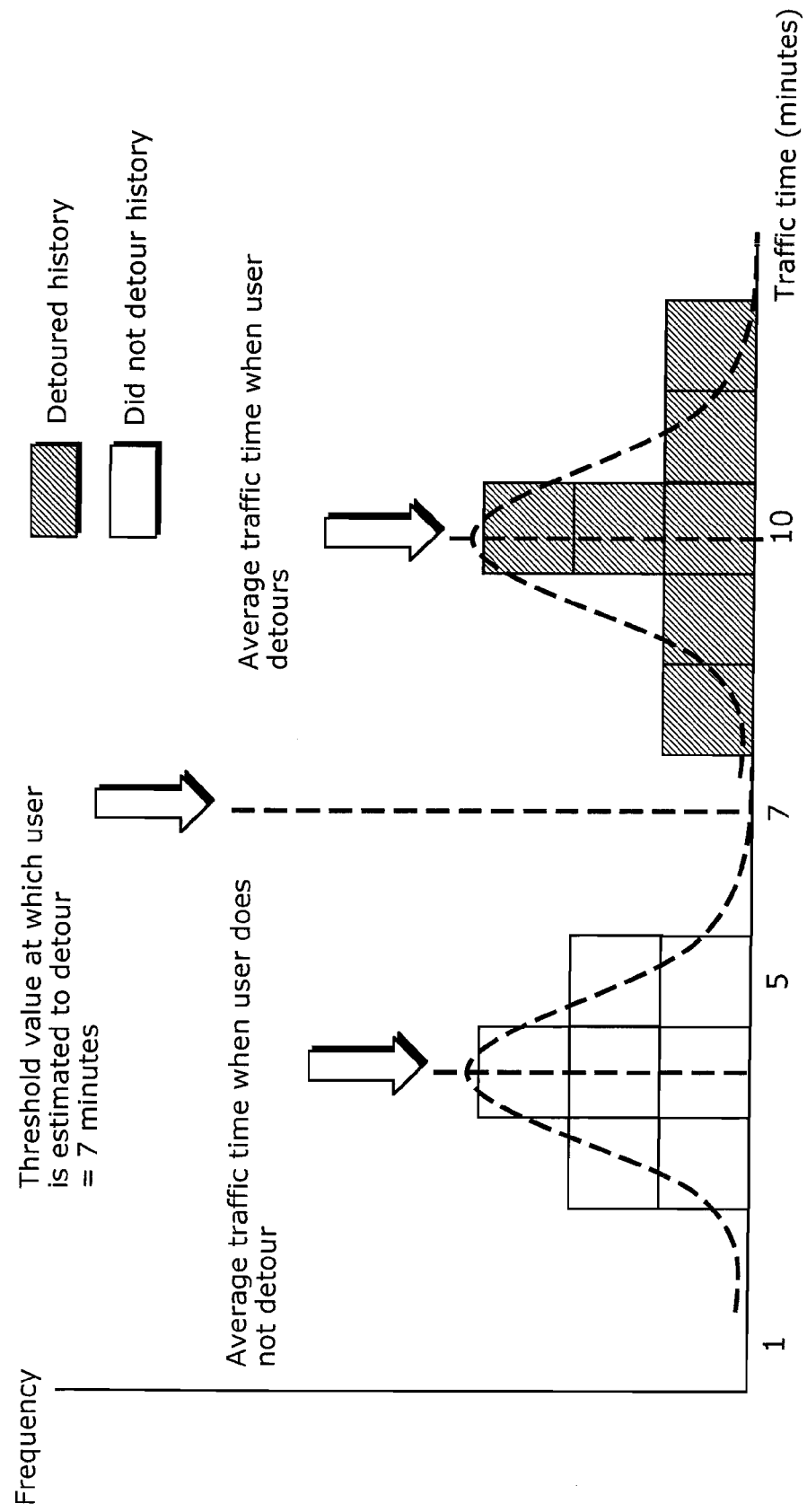

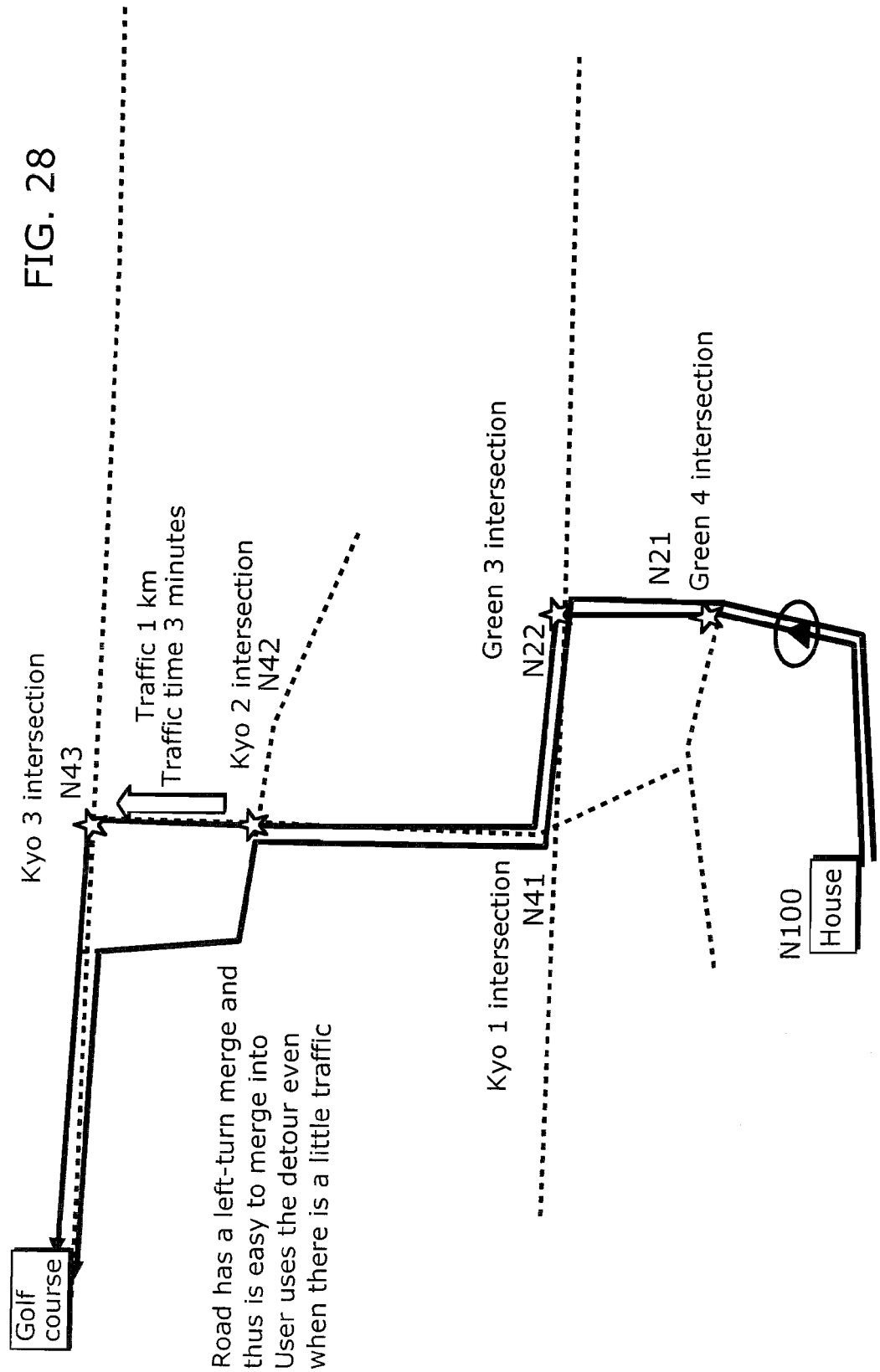

FIG. 29

| Traffic ID | Traffic point | Traffic distance | Traffic time | Traffic level | Provision format | Detourable? | Detour history |
|---|---|---|---|---|---|---|---|
| 080 | N42→N43 | 1km | 3 minutes | 1(Slow) | Screen display | ○ | ○ |
| 083 | N42→N43 | 500m | 2 minutes | 1(Slow) | Screen display | ○ | ○ |
| 090 | N42→N43 | 500m | 2 minutes | 1(Slow) | Screen display | ○ | ○ |
| 091 | N42→N43 | 1km | 1 minutes | 1(Slow) | Screen display | ○ | ○ |
| 093 | N42→N43 | 500m | 0 minutes | 0(Normal) | Screen display | ○ | × |
| 094 | N42→N43 | 1km | 0 minutes | 0(Normal) | Screen display | ○ | × |
| 095 | N42→N43 | 1km | 0 minutes | 0(Normal) | Screen display | ○ | × |
| ⋮ | ⋮ | | | | | | |

FIG. 32

| Traffic ID | Traffic point | Traffic distance | Traffic time | Traffic level | Provision format | Display time | Recognition reliability value | Detourable? | Detour history |
|---|---|---|---|---|---|---|---|---|---|
| 001 | N24→N25 | 1km | 10 minutes | 2(Congested) | Screen display | 200 seconds | 0.2 | ○ | ○ |
| 010 | N24→N25 | 1km | 5 minutes | 1(Slow) | Screen display | 100 seconds | 0.2 | ○ | × |
| 015 | N24→N25 | 1km | 5 minutes | 1(Congested) | Screen display | 300 seconds | 0.2 | ○ | ○ |
| 018 | N24→N25 | 1km | 5 minutes | 1(Slow) | Scroll | 100 seconds | 1.0 | ○ | ○ |
| 019 | N24→N25 | 1km | 5 minutes | 1(Slow) | Audio | — | 0.5 | ○ | ○ |
| 020 | N24→N25 | 1km | 5 minutes | 1(Slow) | Screen display | 100 seconds | 0.2 | ○ | ○ |
| ⋮ | ⋮ | ⋮ | ⋮ | ⋮ | ⋮ | ⋮ | ⋮ | ⋮ | ⋮ |

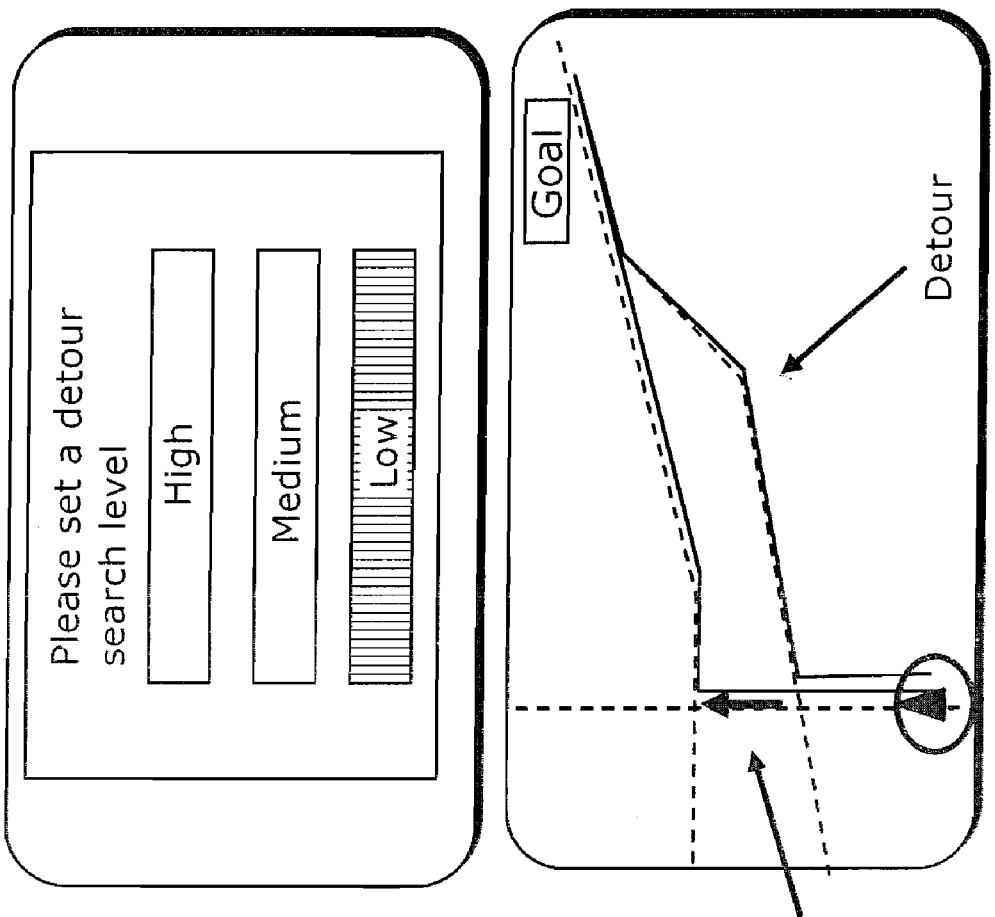

TRANSIT INFORMATION PROVISION DEVICE, METHOD AND PROGRAM

BACKGROUND OF THE INVENTION (1) Field of the Invention

The present invention relates to a transit information provision device which provides transit-related information to a user, and particularly to technology which provides transit information in a mobile terminal device, such as a car navigation system, using the best-suited method in accordance with the user's situation.

(2) Description of the Related Art

Conventionally, there have been devices which store a traffic level set by the user in a mobile terminal such as a car navigation system, and which, when there is traffic on the road ahead, provide a traffic detour according to the set traffic level (Patent Document 1, Japanese Patent Application No. 2003-4469).

FIG. 35 is a diagram which shows a structural example of the device disclosed in Patent Document 1.

In FIG. 35, the route setting unit 11 is a unit which sets the route of the user. The traffic information provision unit 13 is for example a unit which provides traffic information such as VICS information. The current route traffic determination unit 12 is a unit which determines whether or not there is traffic information on the set route. The traffic density setting unit 16 is a unit which sets a traffic density at which a detour is searched for. The traffic density setting unit 16 stores the set traffic density in a traffic density storage unit 17. Subsequently, when it is judged that there is traffic on the current route, a detour is searched for by the detour search and determination unit 14 by taking into account the traffic density and the set traffic density, and a detour is displayed in a display unit 15.

FIG. 36 is a diagram which shows an example of a screen displayed by the display unit 15. As shown in screen 1 in FIG. 36, the user for example sets a traffic density divided into three levels: "high", "medium" and "low". Subsequently when traffic occurs on the set route and satisfies the set traffic density, the detour searched for is displayed, as shown in screen 2.

SUMMARY OF THE INVENTION

The invention disclosed in Patent Document 1 above controls whether or not a detour is provided according to a traffic level set by the user from among the plural traffic levels set beforehand for the case described above in which there is traffic and a detour is provided. Accordingly, although the level is set by the user, the level will not change according to the situation.

However, when information must be provided to a user based on transit events such as a detour, the traffic level differs according to the situation of the user. In other words, when there is a small amount of traffic in an area unfamiliar to the user, the user advances along the traffic route without using a detour. Additionally, it is likely that for many users, compared to points at which the detour conditions are good, traffic points where the detour conditions are poor, such as when the detour is extremely narrow, includes many right and left turns or passes through city streets, the user will endure a comparatively high level of traffic in order to pass through the traffic route.

In this way, depending on the user's situation, there are different traffic levels at which necessary transit information, such as detour information, actually interferes with traveling tasks instead of automatically rerouting the user according to the fixed level set by the user.

The present invention is realized in view of these problems and takes as an object providing a transit information provision device that provides traffic information with a method best-suited to the user's situation.

To solve the problems above, the transit information provision device according to the present invention is a transit information provision device which provides transit information, including: a transit event information acquiring unit which acquires transit event information which expresses a transit-related event; a transit information provision unit which provides the transit information to a user, the transit information relating to transit event information; an information provision format storage unit which stores the transit information provided by the transit information provision unit; a position information extraction unit which successively extracts position information which indicates a present position of the user; a movement history storage unit which stores a sequence of the extracted position information as a movement history; a route acceptance unit which accepts an anticipated movement route for the user; a detour traveling judgment unit which judges whether the user has traveled along the anticipated movement route or has detoured, based on the provided transit information stored by the information provision format storage unit and the movement history stored by the movement history storage unit; a transit information provision rule calculation unit which calculates a rule for providing the transit information using transit event information about the case in which it is judged by the detour traveling judgment unit that the user has traveled along the anticipated movement route, and transit event information about the case in which the user is judged to have detoured by the detour traveling judgment unit; and an information provision control unit which, when new transit event information is acquired, controls the provision of transit information related to the new transit event information by the transit information provision unit, based on the rule.

By controlling the provision of information related to traffic based on a calculated rule, the transit information provision device according to the present invention can provide appropriate traffic information according to the user's situation.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 is a diagram which shows an example of the traffic information expressed in a table;

FIG. 6 is a diagram in which the extracted position information is shown in a table;

FIG. 15 is a diagram which shows traffic information stored as information provision format history in an information provision format storage unit;

FIG. 17 is a diagram which shows a part of the information recognition history stored by an information recognition history storage unit;

FIG. 18 is a diagram which shows an example of the information recognition history in a detailed display screen;

FIG. 19 is a diagram for describing the judgment of whether or not the user has traveled by avoiding traffic; (a) is a diagram which shows an example of a route accepted by the route acceptance unit; (b) is a diagram which shows an example of a history which the user has actually traveled and (c) is a diagram which shows an example of the information stored in the information recognition history storage unit;

FIG. 20 is a diagram for describing judgment of whether or not the user has traveled by avoiding traffic; (a) is a diagram which shows an example of a route accepted by the route acceptance unit; (b) is a diagram which shows an example of a history which the user has actually traveled and (c) is a diagram which shows an example of the information stored in the information recognition history storage unit;

FIG. 21 is a diagram which enumerates information stored by the information recognition history storage unit;

FIG. 22 is a diagram which describes the calculation of a traffic information provision model;

FIG. 28 is a diagram which shows the movement of a user and so on at a specific point;

FIG. 29 is a diagram which shows an information recognition history of the user shown in the present example;

FIG. 32 is a diagram which shows the information recognition history;

FIG. 36 is a diagram which shows a display example of the conventional transit transit information provision device.

NUMERICAL REFERENCES

Figure 1:
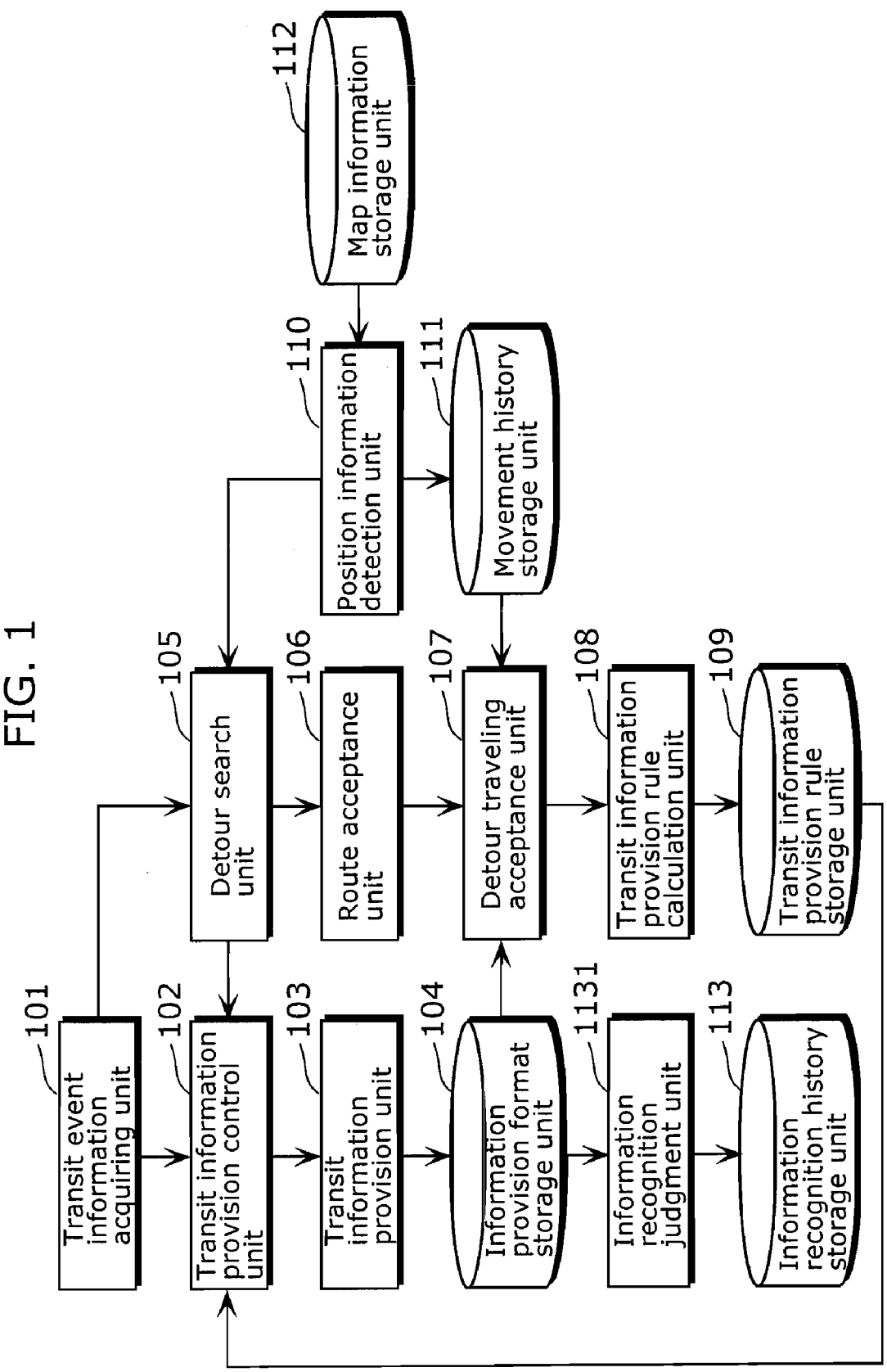
FIG. 1 is a diagram which shows an example of the structure of a transit information provision device in the first embodiment of the present invention.

11 Route setting unit
12 Driving route traffic judgment unit
13 Traffic information provision unit
14 Detour search and determination unit
15 Display unit
16 Traffic density setting unit
17 Traffic density storage unit
101 Transit event information acquiring unit
102 Transit information provision control unit
103 Transit information provision unit
104 Information provision state
105 Detour searching unit
106 Route acceptance unit
107 Detour driving determination unit
108 Transit information provision rule calculation unit
109 Transit information provision rule storage unit
110 Position information detection unit
111 Movement history storage unit
112 Map information storage unit
113 Information recognition history storage unit
1131 Information recognition determination unit

DESCRIPTION OF THE PREFERRED EMBODIMENT(S)

A transit information provision device which provides transit information, the transit information provision device including: a transit event information acquiring unit which acquires transit event information which expresses a transit-related event; a transit information provision unit which provides the transit information to a user, the transit information relating to transit event information; an information provision format storage unit which stores the transit information provided by the transit information provision unit; a position information extraction unit which successively extracts position information which indicates a present position of the user; a movement history storage unit which stores a sequence of the extracted position information as a movement history; a route acceptance unit which accepts an anticipated movement route for the user; a detour traveling judgment unit which judges whether the user has traveled along the anticipated movement route or has detoured, based on the provided transit information stored by the information provision format storage unit and the movement history stored by the movement history storage unit; a transit information provision rule calculation unit which calculates a rule for providing the transit information using transit event information about the case in which it is judged by the detour traveling judgment unit that the user has traveled along the anticipated movement route, and transit event information about the case in which the user is judged to have detoured by the detour traveling judgment unit; and an information provision control unit which, when new transit event information is acquired, controls the provision of transit information related to the new transit event information by the transit information provision unit, based on the rule.

According to this structure, it is possible to provide appropriate transit information according to the situation of the user by controlling provision of transit-related information based on the calculated rule.

Furthermore, the transit information provision device may further include: an information recognition judgment unit which judges a likelihood of recognition by the user of the transit information stored by the information provision storage unit; and an information recognition history storage unit which stores the likelihood of recognition judged by the information recognition judgment unit, wherein the detour traveling judgment unit which judges whether or not the user has intentionally followed the anticipated route or intentionally detoured, using the likelihood of recognition stored in the information recognition history storage unit, and the transit information provision rule calculation unit calculates a rule for providing the transit information using transit event information about the case in which it is judged that the user has intentionally traveled along the anticipated movement route by the detour traveling judgment unit, and provides transit event information about the case in which it is judged by the detour traveling judgment unit that the user has intentionally detoured.

Additionally, the transit information provision device may further include a movement destination prediction unit which predicts a future movement route based on the present position information extracted from the movement history and the position information extraction unit, wherein the route acceptance unit designates the future movement route predicted by the movement destination prediction unit as the accepted route.

According to this structure, it is possible to provide appropriate transit information according to the situation of the user by controlling provision of new transit-related information based on the rule learned from the user's detour action.

Additionally, the transit event information indicates at least one of a degree, a length, a time and a speed related to traffic, which express a density of the traffic, the transit information is traffic information which relates to the traffic, the traffic information rule calculation unit may calculates a threshold value as the rule which determines whether or not to provide information, and the information provision control unit may stop the provision of traffic information related to the new transit event information by the transit information provision unit when new transit event information is acquired and the degree, length, time or speed, which are expressed by the new transit event information and which express the density of the traffic, are less than the threshold value.

According to this structure, since the provision of traffic information can be controlled appropriately, inconveniences in which the user's traveling task are interfered with due to too much traffic information being provided can be avoided.

Additionally, the transit event information further expresses a location where there is traffic, and it is ideal for the traffic information rule calculation unit to calculate an independent rule for each piece of transit information respectively expressing different positions.

According to this structure, traffic information is independently provided for each traffic occurance point and can be controlled in detail.

Additionally, the information provision format storage unit may further store mode information which expresses a mode in which the transit information is provided by the transit information provision unit, and a likelihood of recognition value which expresses a likelihood of recognition which is in accordance with the mode, and the transit information provision rule calculation unit may calculate the rule by assigning weights to when it is judged that the user has traveled intentionally on the anticipated movement route and when it is judged that the user has intentionally detoured using the likelihood of recognition value and the weighted transit event information.

Here, the information provision unit is made up of a display unit which displays the transit information on the screen, and the mode information is information which includes at least one of a display position, a display time, a display timing and whether or not the user has scrolled the screen, which are displayed by the display unit. Additionally, the information provision unit is composed of an audio provision unit which provides transit information in audio, and the format information may be information which includes at least one of the provision location, the provision time and the provision timing provided by the audio provision unit.

According to this structure, since a likelihood of recognition which indicates at what level of assurance the transit information has been recognized by the user can be reflected using a likelihood of recognition value, control of transit information provision can be performed at a higher accuracy compared to when the reliability is expressed as information that indicates whether or not the user has recognized the information.

Additionally, the information provision format storage unit may further store a provided location which expresses a traveling point at which the transit information is provided by the transit information provision unit, the transit information provision unit further including a detourable point calculation unit which may calculate a detourable point where the traffic can be avoided based on the position information extraction unit and the route acceptance unit; and the detour traveling judgment unit may, when the provided position is before the avoidable point, judge that the user has detoured. According to this structure, a more accurate judgment is possible since action taken by the user without knowing the actual amount of traffic can be excluded from the detour traveling judgment. Below, the transit information provision device according to the present invention is described with reference to the drawings.

First Embodiment

FIG. 1 is a diagram which shows an example of the system structure of the transit information provision device in the present embodiment. Below, each constituent element is described and afterwards the functional flow of the present invention is described.

The transit event information acquiring unit 101 is a unit for acquiring information related to transit events. For example using car navigation, information and so on related to transit regulation such as traffic information, construction and closed streets can be acquired through FM, optical beacons and the like, as VICS (Vehicle Information And Communication System) information, for example. The transit event information acquiring unit 101 in the present embodiment is for example a unit which acquires information and so on (below, transit event information) related to for example traffic information and transit regulation.

A transit information provision unit 103 for example is a screen display for car navigation and so on, and is a unit which provides a user with many types of transit information including transit event information acquired by the transit event information acquiring unit 101. Below, an example is described using the drawings.

Figure 2:
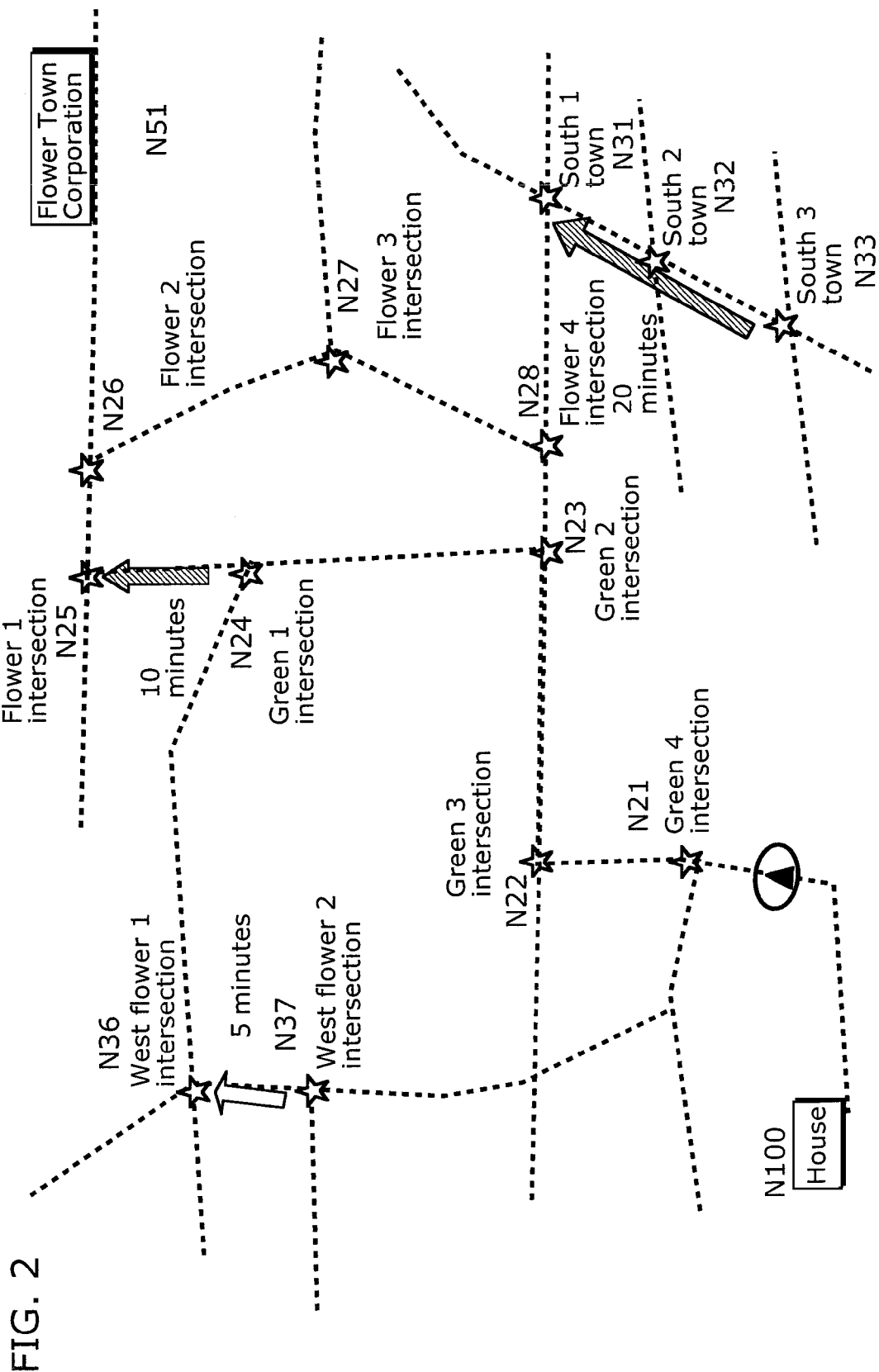
FIG. 2 is a diagram for explaining traffic information provided by the transitinformation provision unit.

FIG. 2 is a diagram for describing transit information provided by the transit information provision unit 103. The arrows in FIG. 2 show traffic information related to traffic included in the transit event information. For example, it is shown with arrows in FIG. 2 that there is traffic from the "Green 1" to the "Flower 1" intersection. FIG. 2 also shows that there is traffic from intersection "South 3 Town" to intersection "South 1 Town", and from "West Flower 2" to "West Flower 1".

Generally VICS traffic information shows traffic instances in a link format (called a VICS link) which joins a pre-judged (node) with another node. The star sign in FIG. 2 stands for a node. For example the intersection "Flower 1 intersection" is displayed as a node ID "N(node) 25". The VICS links mark each intersection and landmark, such as "House" and "Flowertown Corporation", as nodes, and express these intersections and landmarks as a link that associates a node with a node. Additionally, the length of the associated links expresses a traffic distance. For example, generally traffic at "South 1 Town (N31)" which spans a long distance between "South 3 Town (N33)" and "South 2 Town (N32)" is expressed by for example the length of the arrow.

Further, generally the VICS link is acquired as information which indicates traffic density (the traffic level) at the point using the average vehicle speed between the links. The traffic level is divided into three levels, for example: "normal" for traffic level 0 when the average speed is no less than 40 km/h, "slowed" for traffic level 1 when the average speed is no less than 20 km/h and less than 40 km, and "congested" for traffic level 2 when the average speed is less than 20 km. Generally, in car navigation, traffic is displayed with an arrow over the route and further, the traffic density is indicated with colors, and the present embodiment is described in the same way.

More specifically, in FIG. 2 for example there is "congested" traffic from "Green 1 Intersection (N24)" to "Flower 1 Intersection(N25)" and from "South 3 Town (N33)" to "South 1 Town (N31)" which is indicated with a diagonal highlight arrow. On the other hand, there is "slow" traffic from "West Flower 1 Intersection (N36)" to "West Flower 2 Town (N37)", displayed with a white arrow. Further, the time in traffic necessary for passing through each traffic point is provided as VICS information based on the average speed and distance. For example, the traffic time indicated is "10 minutes" from "Green 1 Intersection (N24)" to "Flower 1 Intersection (N25)", "20 minutes" from "South 3 Town (N33)" to "South 1 Town (N31)" and "5 minutes" from "West Flower 2" to "West Flower 1", and so on.

FIG. 3 is a diagram in which the traffic information shown in FIG. 2 is shown in a table. Each traffic point is indicated with a traffic ID. For example, the traffic ID "001" indicates traffic information for "Green 1 Intersection (N24)" to "Flower 1 Intersection (N25)" in FIG. 2, a traffic point "from N24 to N25", a traffic level "2 (congested)", a traffic distance "1 km" and a travel time "10 minutes". Or, the traffic ID "002" indicates "Green 2 Intersection (N23)" to "Green 1 Intersection (N24)", and a traffic point "from N24 to N25", a traffic level "0 (normal)", a traffic distance "0 km", a travel time "0 minutes" and that there is no traffic. In this way the transit event information acquiring unit 101 acquires the traffic information provided from VICS.

In FIG. 1, the route acceptance unit 106 is a unit that accepts a destination, a movement route and so on. For example in the present embodiment, a route search is performed according to the user's destination setting and the route to the destination that is found is inputted.

The position information extraction unit 110 is a unit that extracts the present position of the user. For example, in car navigation, a GPS which extracts the user's present position is attached and latitude/longitude information is extracted within a prejudged period such as 1 second. In the present embodiment, the position information extraction unit 110 is composed of a GPS and the like, and thus extracts latitude/longitude information as movement and thus extracts the position information within the prejudged period.

The detour searching unit 105 is a unit which searches for a detour when there is traffic on the route, from the route accepted by the route acceptance unit 106 and the traffic information acquired by the transit event acquiring unit 101. For example, generally a function is provided for re-searching (a re-route function) a route to the destination based on information acquired from the VICS information and the detour searching unit 105 in the present embodiment reroutes the user in the same way.

The transit information provision control unit 102 is a unit which controls the provision of information by the transit information provision unit 103. The transit information provision unit 103 for example guides the user to the destination by displaying route and transit event information, detours and so on in the display window. Below, an example is described using the drawings.

Figure 4:
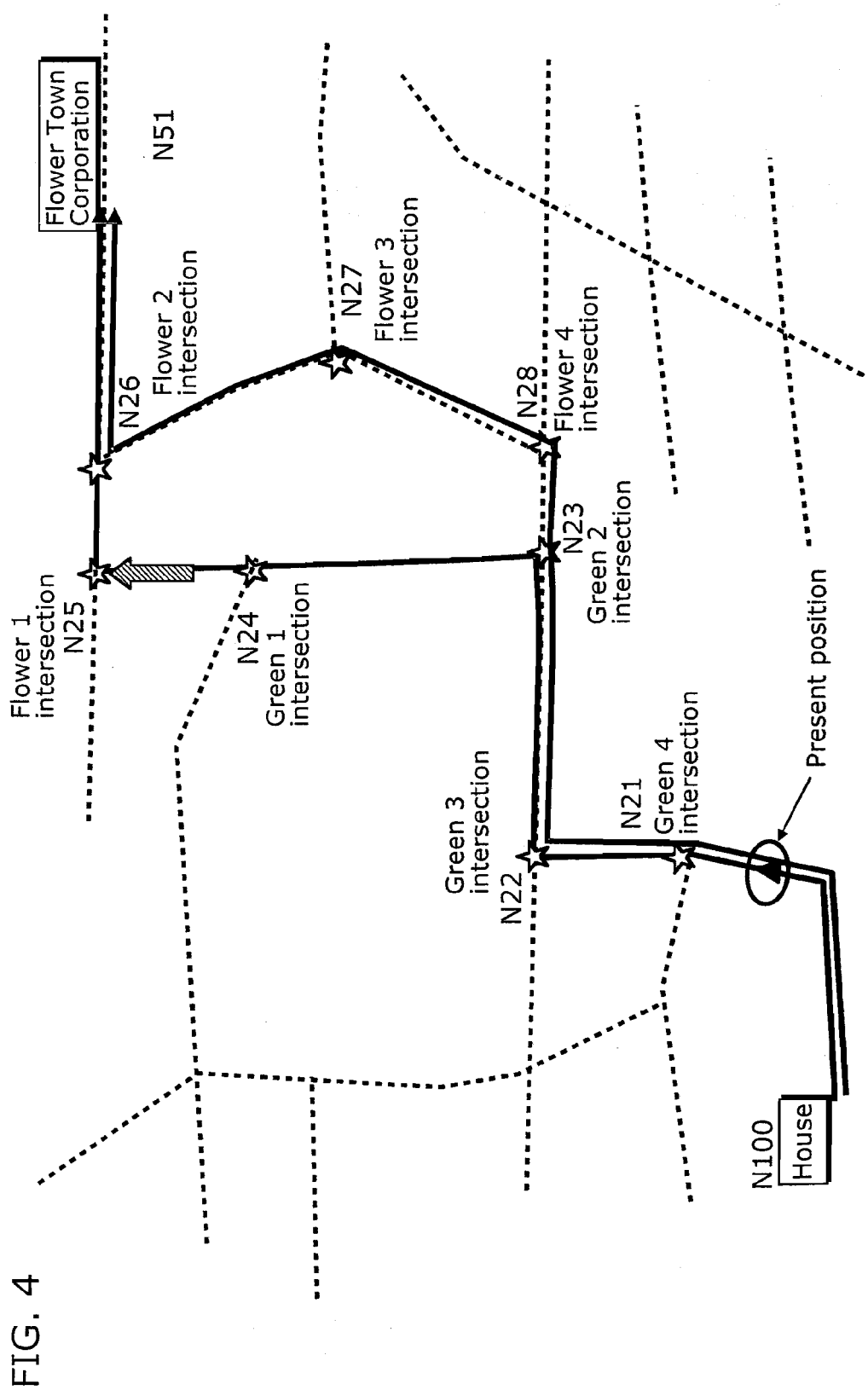
FIG. 4 is a diagram which shows the position of a moving user.

In FIG. 4 the user's position is shown when the user has left the "House" and is heading towards "Flower Town Corporation". In this way, the position information extraction unit 110 extracts the position information according to the movement of the user. Additionally, the destination "Flower Town Corporation" is inputted by the user and a route is searched from "House" through "Green 4", "Green 3", "Green 2", "Green 1", "Flower 1" and "Flower 2" to "Flower Town Corporation". The route found is shown with a bold line. For example, the route acceptance unit 106 inputs the routes found and displays them in the display screen based on control provided by the transit information control unit 102.

Additionally, since there is traffic between "Green 1" and "Flower 1" intersections on the route found that is shown in FIG. 4, a detour is searched for by the detour searching unit 105 since there is traffic between the "Green 1" and "Flower 1" intersections. As shown by the other black bold line, a route that passes through "Green 4", "Green 3", "Green 2", "Flower 4", "Flower 3", "Flower 2" to "Flower Town Corporation" is found as a detour.

The transit information provision device in the present invention guides the user to the destination while displaying traffic information, searched routes and so on, which are acquired by the transit event information acquiring unit 101 in this way, such that the user selects a route and moves along it based on the information provided. For example, when there is traffic on the route, the user selects the detour provided in order to avoid traffic and heads to Flower Town Corporation.

On the other hand even when there is traffic, depending on the user, the user will not necessarily utilize the detour. There are times when there is some traffic and the user will not use the detour, instead moving along the same route. In this way, for the user, the automatic rerouting is for example not needed, and instead of automatically initiating rerouting, traveling tasks are interfered with. Particularly for car navigation, it is preferable to control unnecessary information provision in order to concentrate on traveling. On the other hand, there are cases where a user will utilize a detour even when there is just a little traffic. For a user like this, the reroute is necessary information, and should be performed automatically since operations while traveling are dangerous.

In this way, the density of traffic that the user can tolerate will vary with the user, and there is a need to control information such as a detour according to the density of traffic that the user can tolerate. Thus in the present embodiment, a rule for information provision according to transit event information such as a detour (below, described as an information provision model) is calculated based on the provided transit event information and the user's movement history, and controls information provision based on the calculated information provision model.

In FIG. 1, the movement history storage unit 111 is a unit which stores position information according to the movement of the user that is extracted by the position information extraction unit 110 as a movement history. In the present embodiment, for example, the position information extracted by latitude/longitude is converted into the node based on map information stored by the map information storage unit 112 and is stored in node sequences. This is done because latitude/longitude extracted by GPS and the like includes errors, and since the amount of errors is very large in order to make matching easier since the amount of information is very large. Below, an example is described using the drawings.

Figure 5:
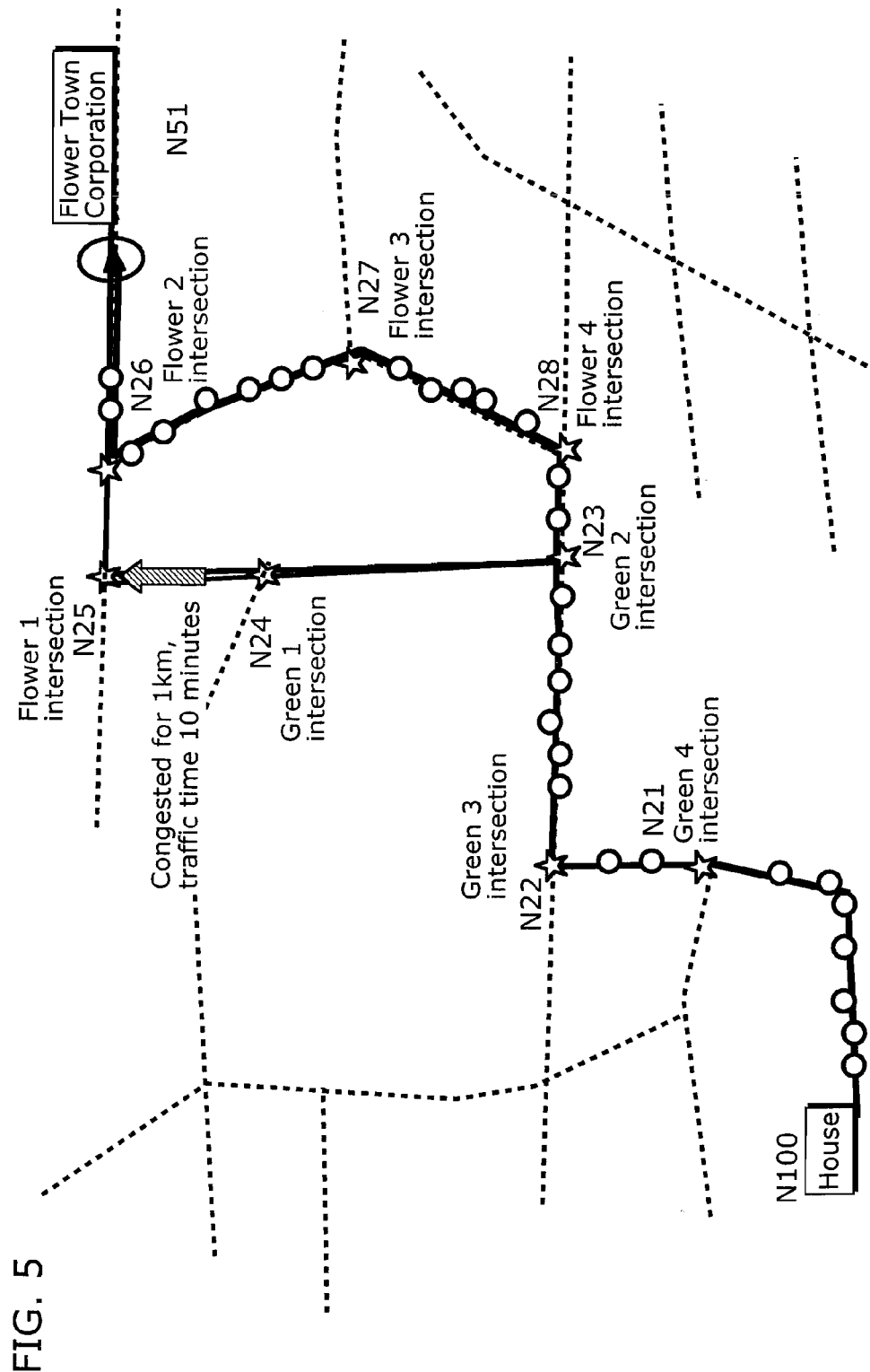
FIG. 5 is a diagram for explaining the movement of a user.

FIG. 5 is a diagram for describing the user's movement. The extracted position information is indicated with a white circle. In FIG. 5, the user advances along the detour by turning right at "Green 3" intersection, passing through "Green 2", turning left at "Flower 4" and through "Flower 3" and "Flower 2" in order to avoid the traffic between "Green 1" and "Flower 1". Additionally, the position information is extracted along with this movement.

FIG. 6 is a diagram in which the extracted position information is shown in a table. For example, latitude/longitude information and time information extracted by GPS at "135 degrees 13 minutes 10 seconds" east longitude and "34 degrees 24 minutes 15 seconds" north latitude on "Sep 20, 2005, 7:45" is extracted. For example "135 degrees 13 minutes 10 seconds" east longitude and "34 degrees 24 minutes 15 seconds" north latitude is a position which indicates the "House" at node "N100". Or, "135 degrees 15 minutes 24 seconds" east longitude and "34 degrees 22 minutes 14 seconds" north latitude extracted on "Sep. 20, 2005, 7:50" is the "Green 4" intersection at "N21". In the present embodiment for example the latitude and longitude information extracted based on the map information and so on is converted into the node and the movement history is stored in a node sequence.

Figure 7:
FIG. 7 is a diagram which shows a movement history stored in the movement history storage unit.

FIG. 7 is a diagram which shows the movement history stored by the movement history storage unit 111. The movement shown in FIG. 5 is stored as a movement history in FIG. 7. More specifically, a movement history is stored with a history ID "001" in which the user leaves the "House" at "7:45", passes through "N21 (Green 4)", "N22 (Green 3)", "N23 (Green 2)", "128 (Flower 4)", "N27 (Flower 3)", "N26 (Flower 2)" and arrives at "N51 (Flower Town Corporation)".

Figure 8:
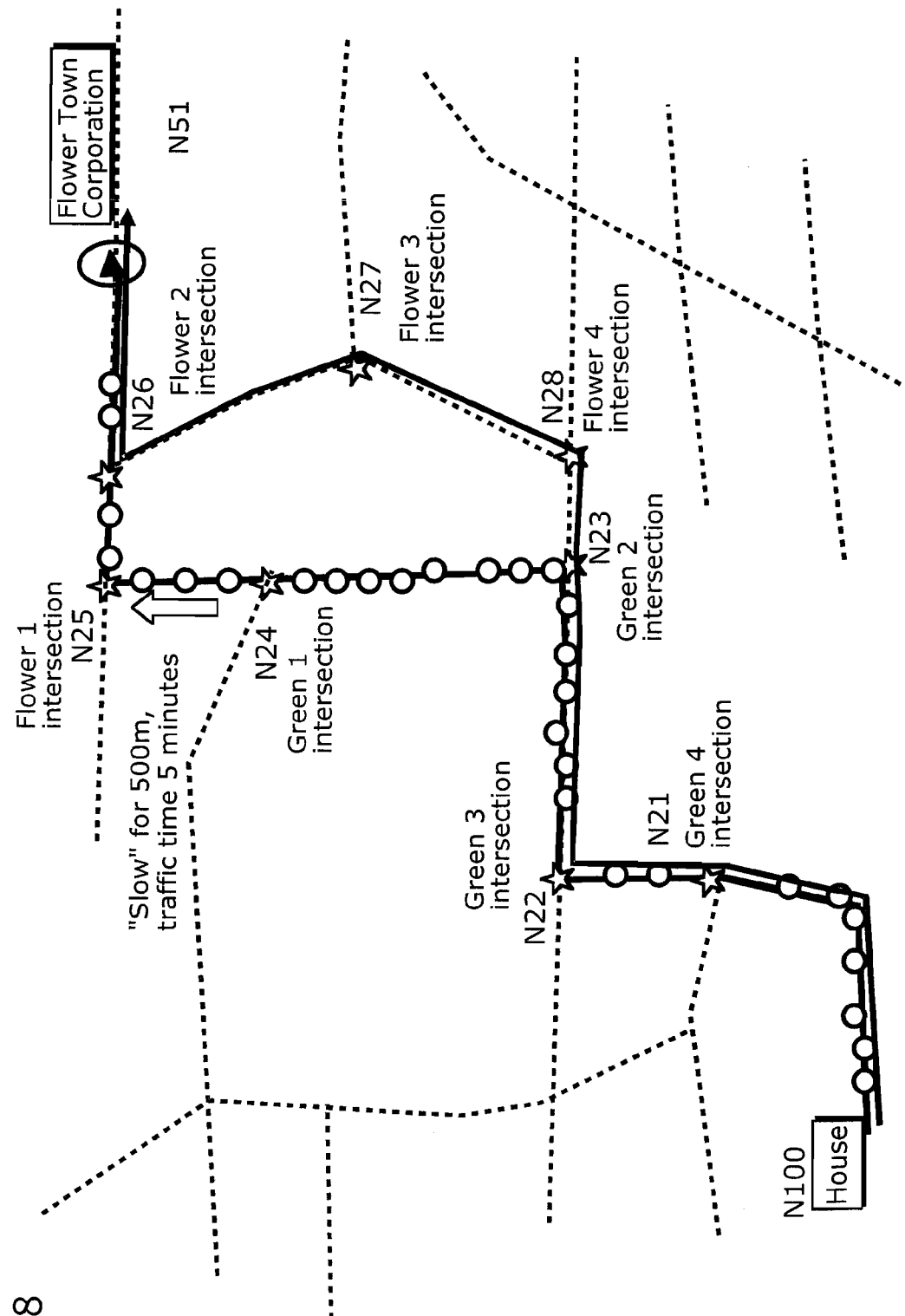
FIG. 8 is a diagram which shows other movement of the user.

FIG. 8 is a diagram which shows another movement. In FIG. 8, the transit situation between "Green 1" and "Flower 1" intersection indicates that the traffic level is "1 (slow)", the traffic distance is "500 m", the traffic time is "5 minutes", and since the traffic level is low compared with FIG. 5, the user does not opt to use the detour at this level of traffic and will continue on the same route. As shown in FIG. 8, the user advances along the same route by turning right at the "Green 3" intersection, turning left at "Green 2", and passing through "Green 1", "Flower 1" and "Flower 2".

Figure 9:
FIG. 9 is a diagram which shows an example of the movement history.

FIG. 9 is a diagram which shows the movement history shown in FIG. 8. More specifically a movement history is stored as a history ID "010" in which the user leaves "House" at "7:35", passes through "N21 (Green 4)", "N22 (Green 3)", "N23 (Green 2)", "N24 (Green 1)", "N25 (Flower 1)", "N26 (Flower 2)" and arrives at "N51 (Flower Town Corporation)".

In this kind of situation, information related to the alternative course is not needed by the user and must be stopped. As shown in FIG. 5 and FIG. 8, the extent to which the user tolerates traffic differs per user, and an information provision model is calculated based on the traffic information and the movement history provided in the present embodiment.

Therefore, in order to calculate an information provision model using the provided traffic information and the movement history, it must be judged whether or not the user has not only recognized the traffic but avoided it. This is for example because an accurate model cannot be calculated by calculating using information in which the user has passed through the traffic points without recognizing the traffic. Below, a description is given using an example.

Figure 10:
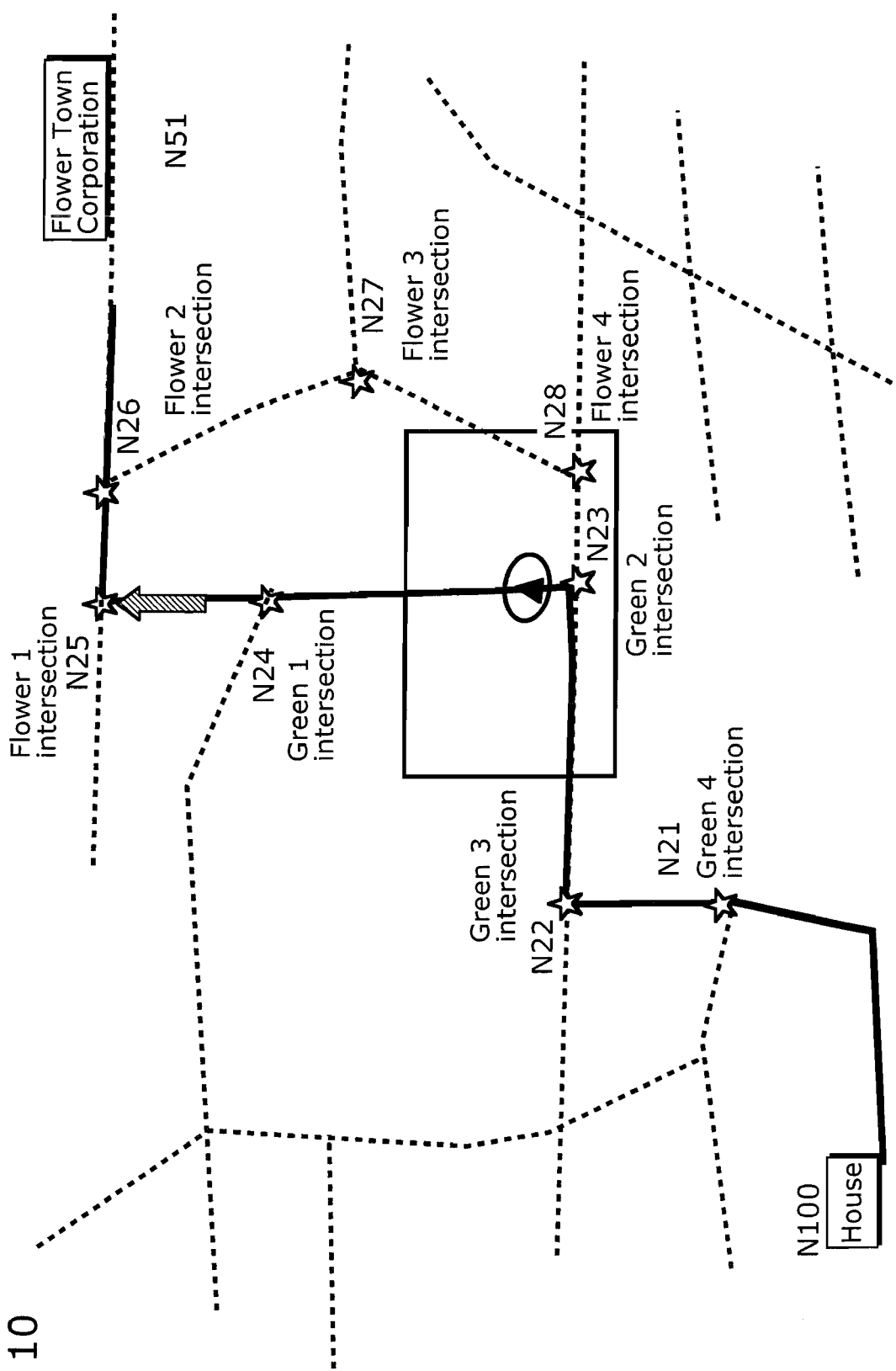
FIG. 10 is a diagram which shows an example of the car navigation screen display range.

The black square frame in FIG. 10 is for example a car navigation display screen. For example, it is common in car navigation for the screen to move with the movement of the user and to guide the user while displaying a map and a route. Generally the display format is 2D or 3D, or a top view, and further the map scale can be set freely.

For example in FIG. 10 the map is displayed in 2D and further a detailed display of the area around the user is shown in detail. When this kind of display is displayed, although the user can ascertain the user's surroundings in detail, traffic information and so on for the route ahead cannot be ascertained without scrolling the screen and so on. For example the user who sees the screen shown in FIG. 10 has not yet recognized that after turning left at the "Green 2" intersection, there is traffic between the "Green 1" and the "Flower 1" intersections. Subsequently, the user travels briefly and ascertains that there is traffic between "Green 1" and "Flower 1".

Even when the user ascertains where there is traffic as well as the density of the traffic, and advances to the "Green 2" intersection along the detour, the user enters traffic since the user can no longer avoid the traffic, and a movement history is stored indicating that the user did not avoid traffic of that density. Accordingly, when an information provision model is calculated using this kind of history, the extent to which the user tolerates traffic cannot be accurately calculated.

Figure 11:
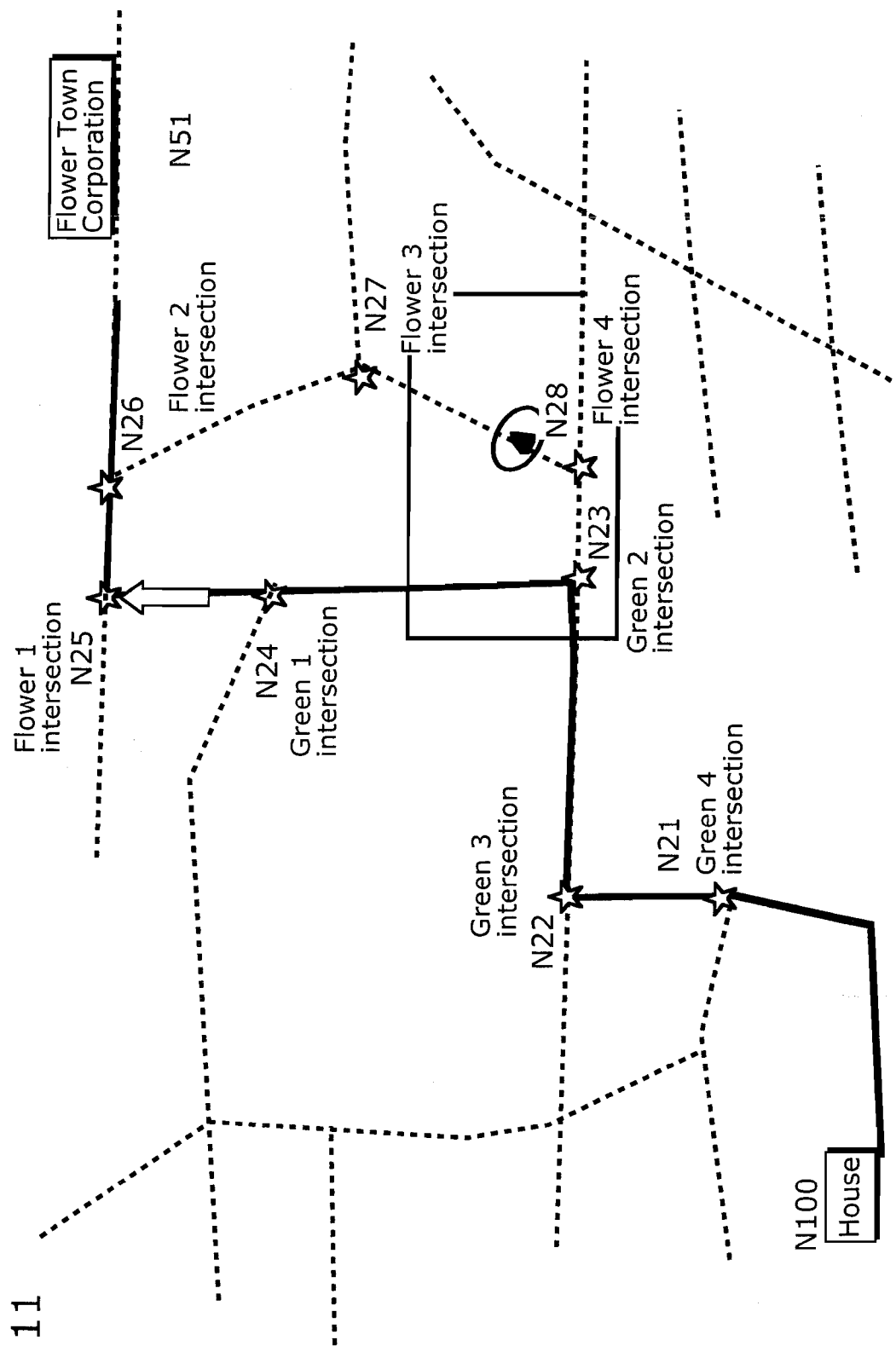
FIG. 11 is a diagram which shows the movement when the user travels along the detour.

FIG. 11 shows user movement when the user has traveled along the detour. Traffic in the "Green 1" and "Flower 1" intersections in FIG. 11 is less than traffic in FIG. 10. Additionally, the display screen is shown as a square frame and is shown in detail as in FIG. 10. The user advances directly to the "Green 2" intersection and turns left at "Flower 4", in other words the user travels along the detour. The user who is viewing the detailed view selects the route without knowing that there is traffic between "Green 1" and "Flower 1" intersections.

Even when the user ascertains beforehand where the traffic is as well as the density of the traffic, and advances along the traffic route without selecting a detour, the movement history stores that the user took a detour even though the density of traffic was low. Accordingly, when an information provision model is calculated using this kind of history, the extent to which the user tolerates traffic cannot be accurately calculated.

Thus, in the present embodiment, an information provision model is calculated using the information that the user ascertained that there is traffic and whether or not the user advanced through the traffic.

The information provision format storage unit 104 in FIG. 1 is a unit which stores the format of information provided by the transit information provision unit 103 as a history (below, described as information provision format store). For example, generally the traffic information is displayed as an arrow on the display screen. Thus in the present embodiment, it is judged whether or not the traffic information is displayed on the screen, and when the traffic information is displayed, it is recognized and stored that the user ascertains the traffic and that traffic information is provided to the user. Below, an example is described using the drawings.

Figure 12:
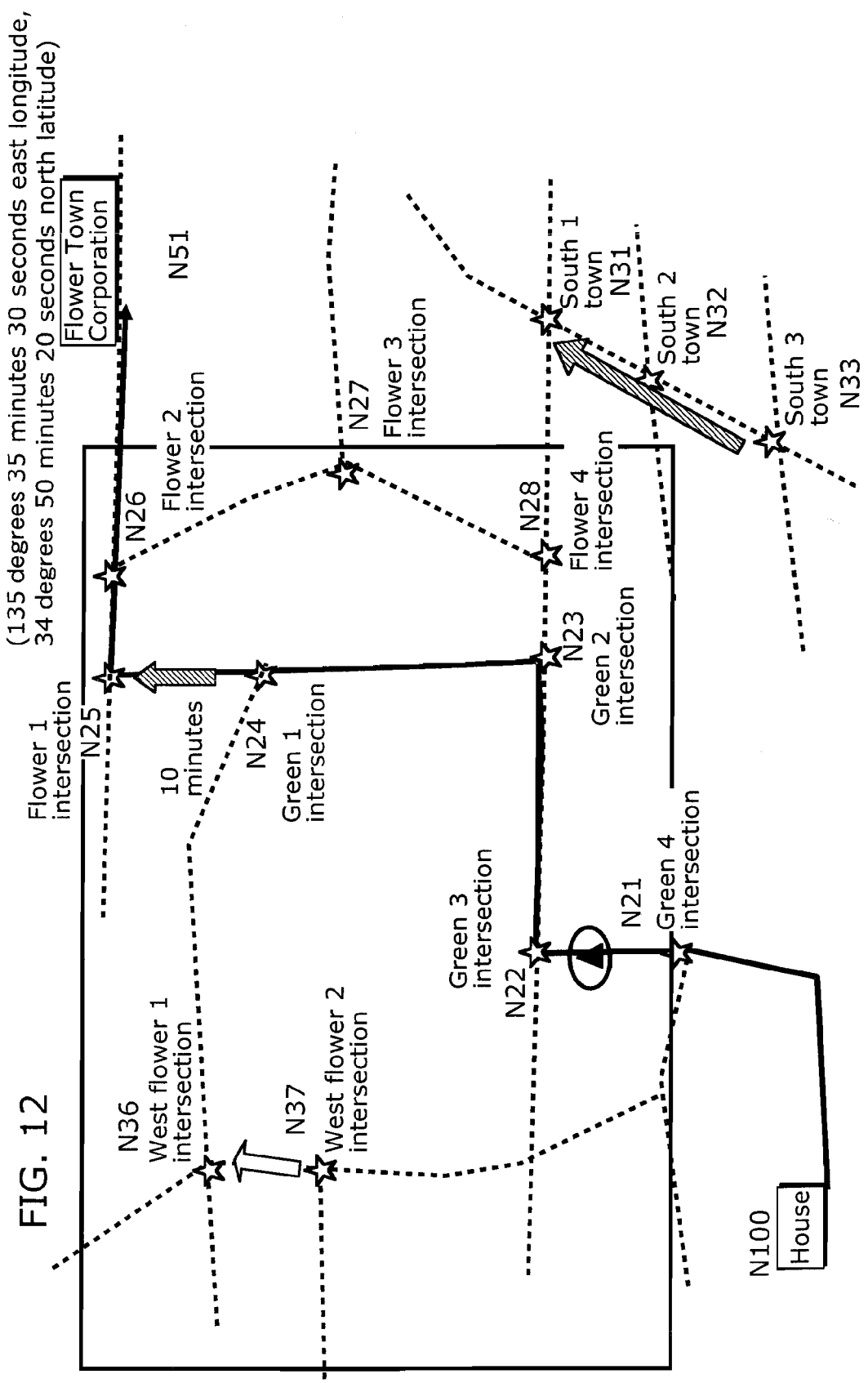
FIG. 12 is a diagram for describing the format for providing traffic information.

FIG. 12 is a diagram for describing the format in which traffic information is provided. The user is presently positioned at a point past the "Green 4" intersection. The display screen shown with the four sided frame in FIG. 12 is a wide area display which displays the map in a wide view. With wide area display, the user can ascertain traffic information for the road ahead. For example, it is indicated with an arrow on the screen that there is traffic between the "Green 1" and "Flower 1" intersection and when displayed on the screen in this way, traffic information is stored in the information provision format storage unit 104 since it can be regarded that the user has recognized that there is traffic.

Figure 13:
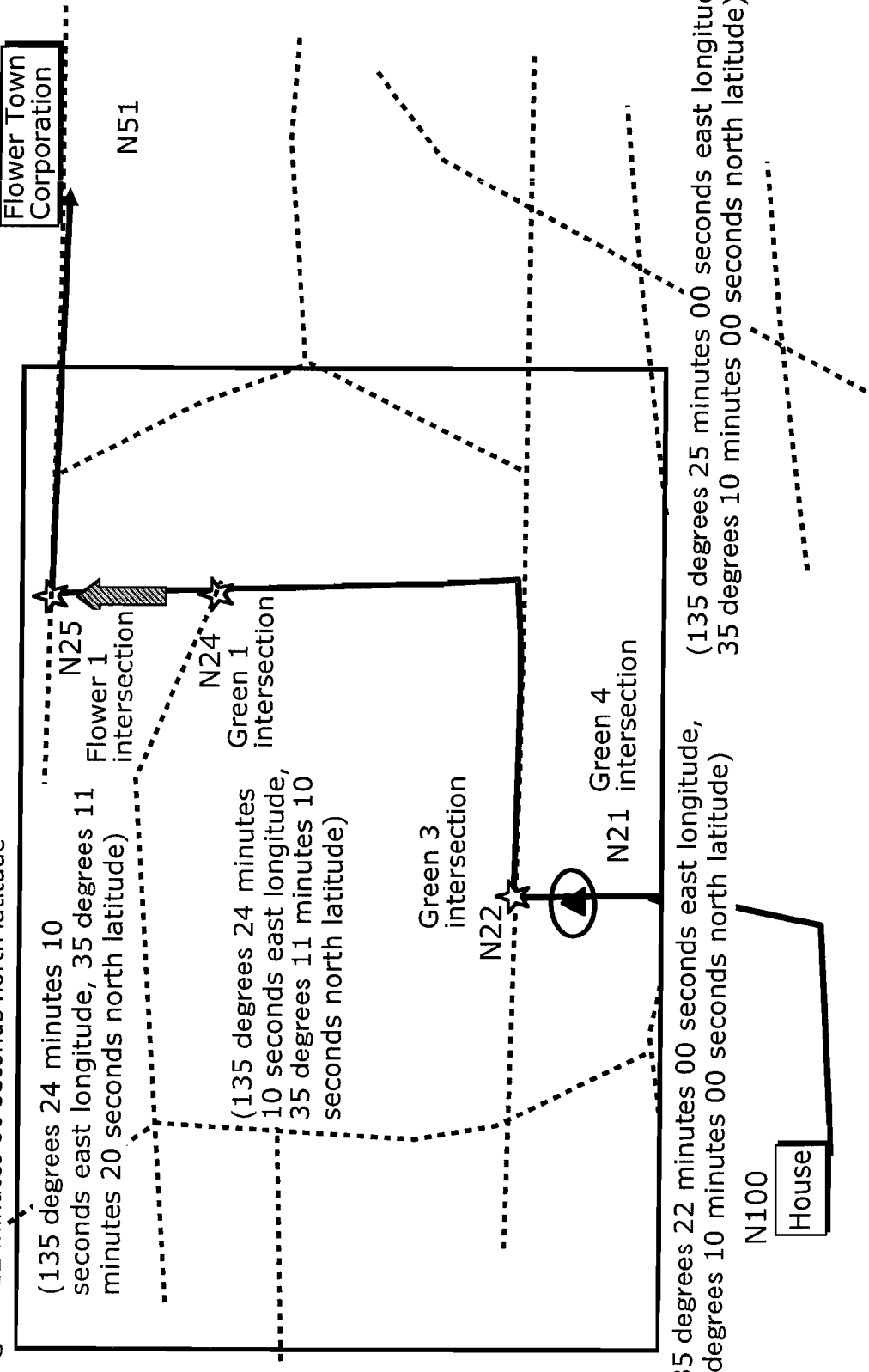
FIG. 13 is a diagram for describing the format for providing traffic information.

The judgment of whether or not the traffic information is displayed on the screen is for example performed by calculating the region presently displayed based on the scale of the screen display. FIG. 13 is a diagram which shows traffic information with the same sort of screen as FIG. 12. The screen in FIG. 13 always displays with the direction north at the top of the screen. In this case, the vertical axis can be shown by latitude and the horizontal axis by longitude. For example presently in FIG. 13, a region from "135 degrees 22 minutes 00 seconds" east longitude to "135 degrees 25 minutes 00 seconds" east longitude and "35 degrees 10 minutes 00 seconds" north latitude to "35 degrees 12 minutes 00 seconds" north latitude is displayed. On the other hand, the intersections where there is traffic, "Green 1" and "Flower 1", are included on the screen area displayed respectively at 135 degrees 24 minutes 10 seconds east longitude, 35 degrees 17 minutes 10 seconds north latitude, and 135 degrees 24 minutes 10 seconds east longitude, 35 degrees 17 minutes 20 seconds north latitude. Thus information indicating that the traffic points have been displayed is stored.

Figure 14:
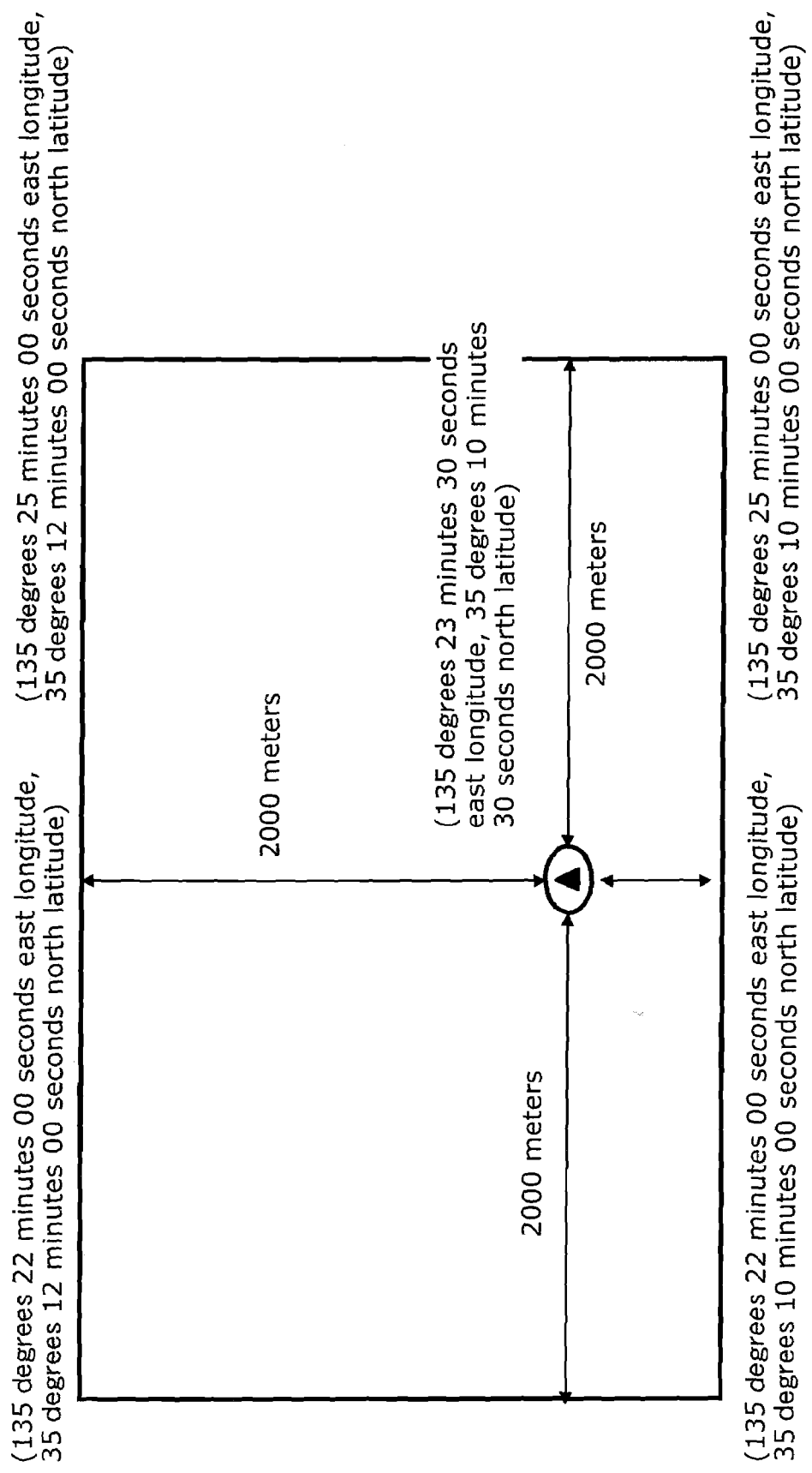
FIG. 14 is a diagram for describing the calculation of the present position and an area presently displayed from the scale of the screen display.

FIG. 14 is a diagram for describing calculation of the area presently displayed using the scale of the present position and the screen display. Generally, car navigation and the like display map information near the present position at a set angle. Further, the map is generally displayed such that the user's movement direction is prioritized in order to make the user's movement direction more understandable.

For example the user in FIG. 14 is positioned at "135 degrees 23 minutes 30 seconds" east longitude, "35 degrees 10 minutes 30 seconds" north latitude. Additionally, the screen display scale in FIG. 14 is set as "2000 meters". This is a setting which displays a region 2000 meters ahead of and to the left and right of the position of the user. From the present position and the scale of the screen, the upper left of the screen is calculated as 135 degrees 22 minutes 00 seconds east longitude, 35 degrees 12 minutes 00 seconds north latitude and the upper right of the screen is calculated as 135 degrees 25 minutes 00 seconds east longitude, 35 degrees 12 minutes 00 seconds north latitude (calculating that roughly 1 degree=1500 meters). Additionally, the bottom left of the screen is calculated as 135 degrees 22 minutes 00 seconds east longitude, 35 degrees 10 minutes 00 seconds north latitude and the lower right of the screen is calculated as 135 degrees 25 minutes 00 seconds east longitude, 35 degrees 10 minutes 00 seconds north latitude. Thus it is judged whether or not traffic points are included in the display region on the screen.

FIG. 15 is traffic information stored as an information provision format history in the information provision format storage unit 104. Among the information acquired as VICS information, the information displayed on the screen and the format of the information is stored. For example, the traffic point "from N24 to 125", a traffic distance "1 km" and a traffic time "10 minutes" and the format provided "Screen display" are stored as the traffic ID "001".

Note that it is understood from the VICS information that there is traffic between the "South 3" to "South 1" intersections. However this traffic information is not shown on the screen and since the user does not ascertain the traffic points, the information is not used. Additionally, it is understood that there is traffic between the "West Flower 2" and "West Flower 1" intersections. Accordingly there is a possibility that the user recognizes traffic at the point. However, the traffic is not something that the user will consider since the user is moving towards the "Flower Town Corporation".

In other words in the present embodiment, for example there is traffic on the accepted traveling route and the display format is stored using information about whether or not the traffic is displayed on the screen. However, since the user will not necessarily move along the accepted route, all traffic information that can be estimated as recognized by the user is stored, and afterwards, the user may select new information and so on to reconsider by referencing the movement history.

On the other hand, even when the traffic points are displayed on the screen and the user has recognized the traffic points, it is important whether or not the user has ascertained the traffic point at a point where traffic can be avoided. In the present embodiment, for example the final point at which traffic from the movement route and the detour can be avoided is calculated and it is judged whether or not the user has recognized the traffic before passing through a point at which the traffic can be avoided.

The detour traveling judgment unit 107 in FIG. 1 is a unit which judges whether or not the user has recognized the traffic and whether or not the user has traveled along the detour, using the traffic information stored in the information provision format storage unit 104 and the movement history stored in the movement history storage unit 111. A dividing point which is the final point at which the detour can be taken (below, a final detourable point) is calculated using first, the route accepted by the route acceptance unit 106, the provided and stored traffic information, and the detour. Subsequently, the information recognition judgment unit 1131 judges whether or not the user has recognized the traffic before passing through the final traffic avoidance point that has been calculated. Thus the information (as an information recognition store) is stored in the information recognition history storage unit 113. Subsequently, it is judged whether or not the user has avoided the traffic using the stored information recognition history and the movement history. Below, an example is described using FIG. 16.

Figure 16:
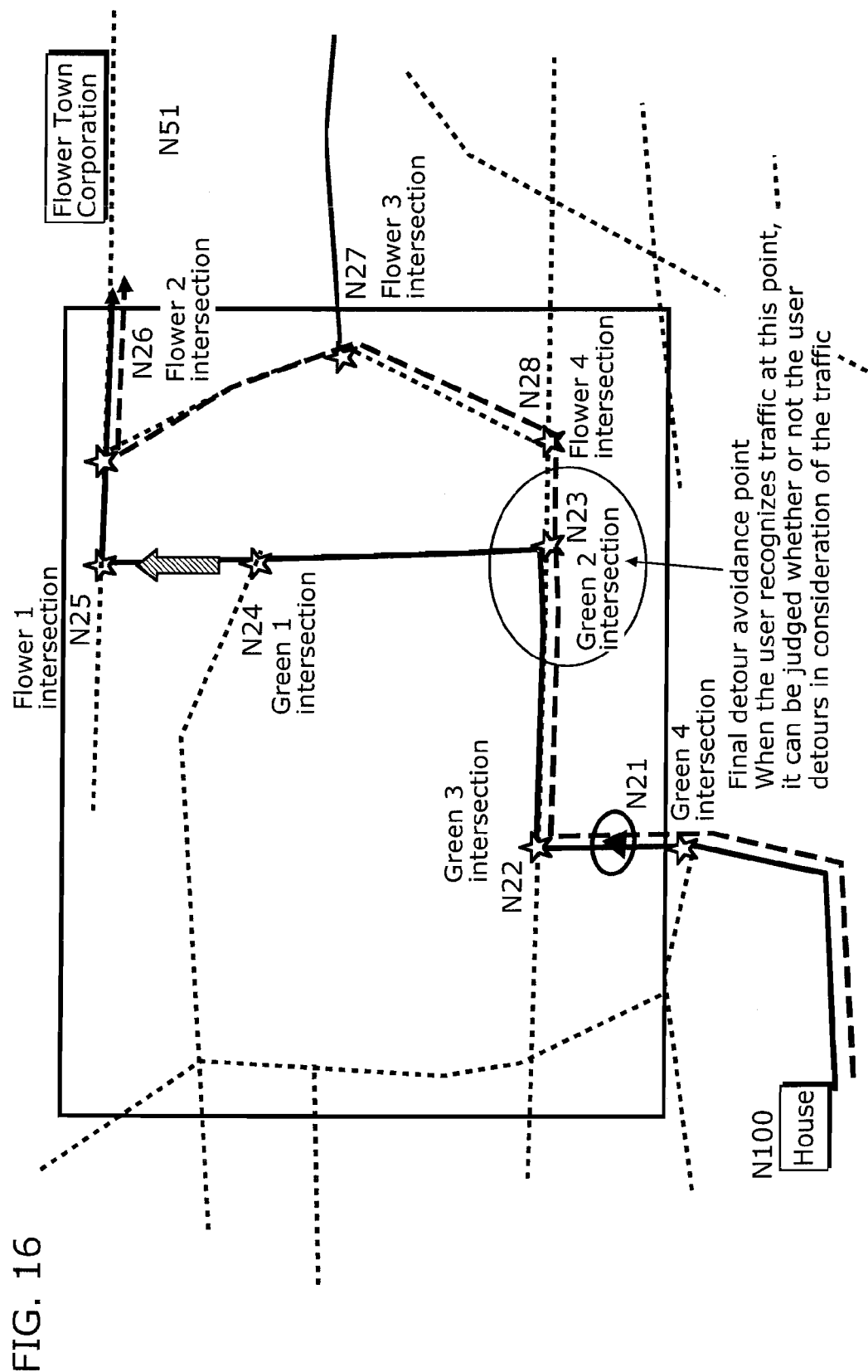
FIG. 16 is a diagram which shows the movement of the user.

FIG. 16 is a diagram which shows the movement of the user, in the same way as FIG. 12. A route accepted by the route acceptance unit 106 which turns left at the intersection "Green 2" and passes through "Green 1" and "Flower 1" is shown with a bold black line. FIG. 16 shows that there is traffic between the "Green 1" and "Flower 1" intersections. On the other hand, a detour in which the user advances directly through the "Green 2" intersection, turns left at "Flower 4" and passes through "Flower 3" and "Flower 2" is indicated with a black line. The detour traveling judgment unit 107 calculates a final detourable point from the inputted route and the detour. In this case, the input route and the detour split at the "Green 2" intersection and the "Green 2" intersection is the final detourable point. Subsequently it is judged whether or not the user has recognized the traffic before passing through the final detourable point.

For example in FIG. 16, the user is presently positioned directly in front of the "Green 3" intersection and traffic is displayed on the screen between the "Green 1" and "Flower 1" intersection before passing through the "Green 2" intersection which is the final detourable point. Accordingly, it can be assumed that the user has ascertained that there is traffic before the point at which the user can detour. Thus, it is stored in the information recognition history that the user has ascertained that there is traffic before the final detourable point.

FIG. 17 is a part of the information recognition history stored in the information recognition history unit 113. In addition to the information provision format shown in FIG. 15 information is attached that is provided to the user before the final detourable point. Here, a circle is shown in the "detourable" column. Further, it can be calculated whether or not the user has ascertained that there is traffic as well as how the user moved by referencing the movement history and taking into consideration the movement undertaken afterwards by the user. For example, when traffic is avoided, this means that the traffic has a traffic density which the user hopes to avoid. On the other hand, when the user stays on the same course without avoiding traffic, the traffic is not at a density which the user recognizes, and for example afterwards the user can control provision of the detour and so on.

On the other hand, as shown in FIG. 10 above and so on, when the user passes the final detourable point and is first displayed on the screen and ascertained, afterwards the movement undertaken by the user is not taken into consideration. This is because in this case, the user cannot avoid the traffic no matter its density and since the user must travel through the traffic point, it is not appropriate to use the traffic point to calculate the information provision model calculation.

For example, FIG. 18 shows the information recognition history with a detailed display screen as in FIG. 10. As in FIG. 17, traffic information is shown between the "Green 1" and "Flower 1" intersections and the information provision format is "Screen display" since the user advances a bit and this is displayed on the screen subsequently. On the other hand, in the detailed display, an "X" is recorded in the "detourable" column and the movement undertaken by the user is not taken into consideration since the user has already passed through the "Green 2" intersection which is the final detourable point when information about the traffic point is ascertained.

Next, it is judged whether or not the user avoided the traffic and has traveled through it using the information and the movement history at which the user recognizes that there is traffic before the final detourable point.

FIGS. 19 (a) through (c) are diagrams for describing the judgment of whether or not the user has avoided and traveled through the traffic. Here, a description is given using the situation shown in FIG. 5. First, a route accepted by the route acceptance unit 106 is shown in FIG. 19 (a). A route is inputted in which the user leaves the "House", passes through the "Green 4" intersection, "the Green 3" intersection, the "Green 2" intersection, "the Green 1" intersection, "the Flower 1" intersection, "the Flower 2" intersection and arrives at the "Flower Town Corporation". In FIG. 19 (c), information for between the "Green 1 (N24)" and "Flower 1 (N25)" intersections is stored in the information recognition history storage unit 113. A "circle" is inserted into the detourable column when there is traffic and the user has ascertained that there is traffic before the final detourable point.

In FIG. 19 (b), a history of the user's actual traveling is stored. In FIG. 19 (b), as in FIG. 7, a history is stored in which the user leaves the "House", passes through the "Green 4" intersection, "the Green 3" intersection, the "Green 2" intersection, the "Flower 4" intersection, "the Flower 3" intersection, "Flower 2" intersection and arrives at the "Flower Town Corporation". When both routes are compared, in comparison to the inputted route of "Green 1" and "Flower 1", the route on which the user actually travels passes through the "Flower 4" intersection and the "Flower 3" intersection, in other words it is possible that the user passed through the route of "Flower 4" and "Flower 3" in order to detour around traffic between "Green 1" and "Flower 1". Thus, in the detour traveling judgment unit 107, information is added which indicates that the user has avoided the traffic and traveled. For example, a "circle" is recorded in the "detour history" column in FIG. 19 (c). In this way, information concerning whether or not the user finally detoured is added to the information recognition history and is stored again as information recognition history.

FIGS. 20 (a) through (c) are diagrams for describing the judgment of whether or not the user avoided traffic and advanced, using the situation shown in FIG. 8. First, in FIG. 20 (a), a route accepted by the route acceptance unit 106 is shown in FIG. 19 (a). A route is inputted in which the user leaves the "House", passes through the "Green 4" intersection, "the Green 3" intersection, the "Green 2" intersection, "the Green 1" intersection, the "Flower 1" intersection, "the Flower 2" intersection and arrives at the "Flower Town Corporation". In FIG. 20 (c), information for between the "Green 1 (N24)" and "Flower 1 (N25)" intersections is stored in the information recognition history storage unit 113. A "circle" is attached to the detourable column since the user has recognized that there is traffic before the final detourable point as in FIG. 19. In the situation shown in FIG. 8, the traffic density is traffic time "5 min.", the traffic distance "1 km" and the traffic level "1 (slow)".

In FIG. 20 (b), a history of the user's actual traveling is stored. In FIG. 20 (b), as in FIG. 9, a history is stored in the movement history ID "010" in which the user leaves the "House", passes through the "Green 4" intersection, the "Green 3" intersection, the "Green 2" intersection, the "Green 1" intersection, the "Flower 1" intersection, the "Flower 2" intersection and arrives at the "Flower Town Corporation". FIG. 20 (b) shows that when comparing both routes, the user actually moves along the inputted route. In other words, there is traffic between "Green 1" and "Flower 1", and although the user shown in the present example recognizes the traffic beforehand, it can be assumed that the user does not detour and that the user proceeds along the route as normal at the present level of traffic. Thus, in the detour traveling judgment unit 107, information is added which indicates that the user has avoided the traffic and traveled. For example, a "circle" is recorded in the "detour history" in FIG. 20 (c).

The transit information provision rule calculation unit 108 in FIG. 1 is a unit which calculates an information provision rule for the traffic density and so on which provides, using the detour traveling judgment unit 107, traffic information and the like based on the information of whether or not the user actually detoured. Subsequently the calculated information provision model is stored in the transit information provision rule storage unit 109.

FIG. 21 is an illustration of information stored in the information recognition history storage unit 113. As noted above, traffic information indicating when the user has traveled previously is displayed before the final detourable point, is estimated to have been recognized by the user, and is stored in the information recognition history storage unit 113.

Information (the detour history) is illustrated at the top of FIG. 21 which indicates, whether or not the user has avoided the traffic after the user has recognized the traffic. For example, the traffic ID "001" is the information recognition history shown in FIG. 19, which shows that, for the traffic point "from N24 to N25", the traffic time is "10 minutes", the traffic level is "2 (congested)", the provision format is "Screen display", the traffic is "O" detourable, the detour history is "O" and that, after the user has recognized the traffic, the user has detoured. Additionally, information recognition history provided at each of the total 7 points with the traffic IDs "007", "015", "018", "019", "020", "021" and so on is shown in FIG. 19.

Information (the detour history) is illustrated at the bottom of FIG. 21 which indicates that the user moved without detouring around the traffic after the user has recognized the traffic. The traffic ID "010" is the information recognition history shown in FIG. 20, which shows that, for the traffic point "from N24 to N25", the traffic time is "5 minutes", the traffic level is "1 (slow)", the provision format is "Screen display", the traffic is "O" detourable, the detour history is "X" and that, after the user has recognized the traffic, the user has detoured. Additionally, information recognition history provided at each of the total 7 points with the traffic IDs "011", "012", "016", "017", "022", "023" and so on are shown in FIG. 19.

The transit information provision rule calculation unit 108 calculates a traffic density which provides traffic information and the like based on the information indicating whether or not the user actually detoured. Here, the information provision model is calculated using, for example, the traffic time. Note that the traffic time is used here in order to calculate the information provision model specific to the user in a more flexible way since the traffic level is divided into only three levels and the traffic distance depends on the route. Below, an example is described using FIG. 22.

FIG. 22 is a diagram which describes the calculation of a traffic information provision model. The graph shown in FIG. 22 expresses traffic time on the horizontal axis and frequency on the vertical axis. For example, the traffic IDs "001", "015" and "018" shown in FIG. 21 are histories in which the user has detoured, and since the traffic time at each point is "10 minutes", the frequency in which the user detours for the traffic time of "10 minutes" is 3 histories. In the same way, when the frequency of each traffic time is calculated from the information shown in FIG. 21, "8 minutes" is "1 time", "9 minutes" is "1 time", "11 minutes" is "1 time" and "12 minutes" is "1 time". Additionally, the average traffic time when the traffic is avoided is calculated as "10 minutes" from the frequency and traffic time.

On the other hand, the traffic IDs "010" and "017" shown in FIG. 21 are histories in which the user did not detour, and since the traffic time at each point is "5 minutes", frequency in which the user does not detour for the traffic time of "5 minutes" is 2 histories. In the same way, when the frequency of each traffic time is calculated from the information shown in FIG. 21, "3 minutes" is "2 times" and "4 minutes" is "3 times". Additionally, the average traffic time when the user does not avoid traffic is calculated as "4 minutes" using the frequency and the traffic time.

Further, a threshold value can be calculated from the average traffic time when the user avoids the calculated detour and from the average traffic time when the user does not avoid the detour. For example, a threshold value which is a median between the two values "4 minutes" and "10 minutes" can be calculated using "7 minutes=(10+4)÷2". In other words, a time threshold value of "7 minutes" can be calculated when the user avoids normal traffic from the information about whether or not a user has previously avoided traffic. Subsequently the threshold value for the traffic time when information is provided is described as a rule (the information provision model) and stored in the transit information provision rule storage unit 109.

Note that a threshold value for each class (both classes, when the user detours and does not detour) and an average value for both classes is found and the average value is calculated as a median, however the present invention is not limited to this method. For example, a method which calculates a threshold value for two conventionally known classes such as an SVM (Support Vector Machine) may be used.

The transit information providing control unit 102 controls the provided transit information by referencing the information provision model stored in the transit information provision rule storage unit 109. Below, an example is described using the drawings.

Figure 23:
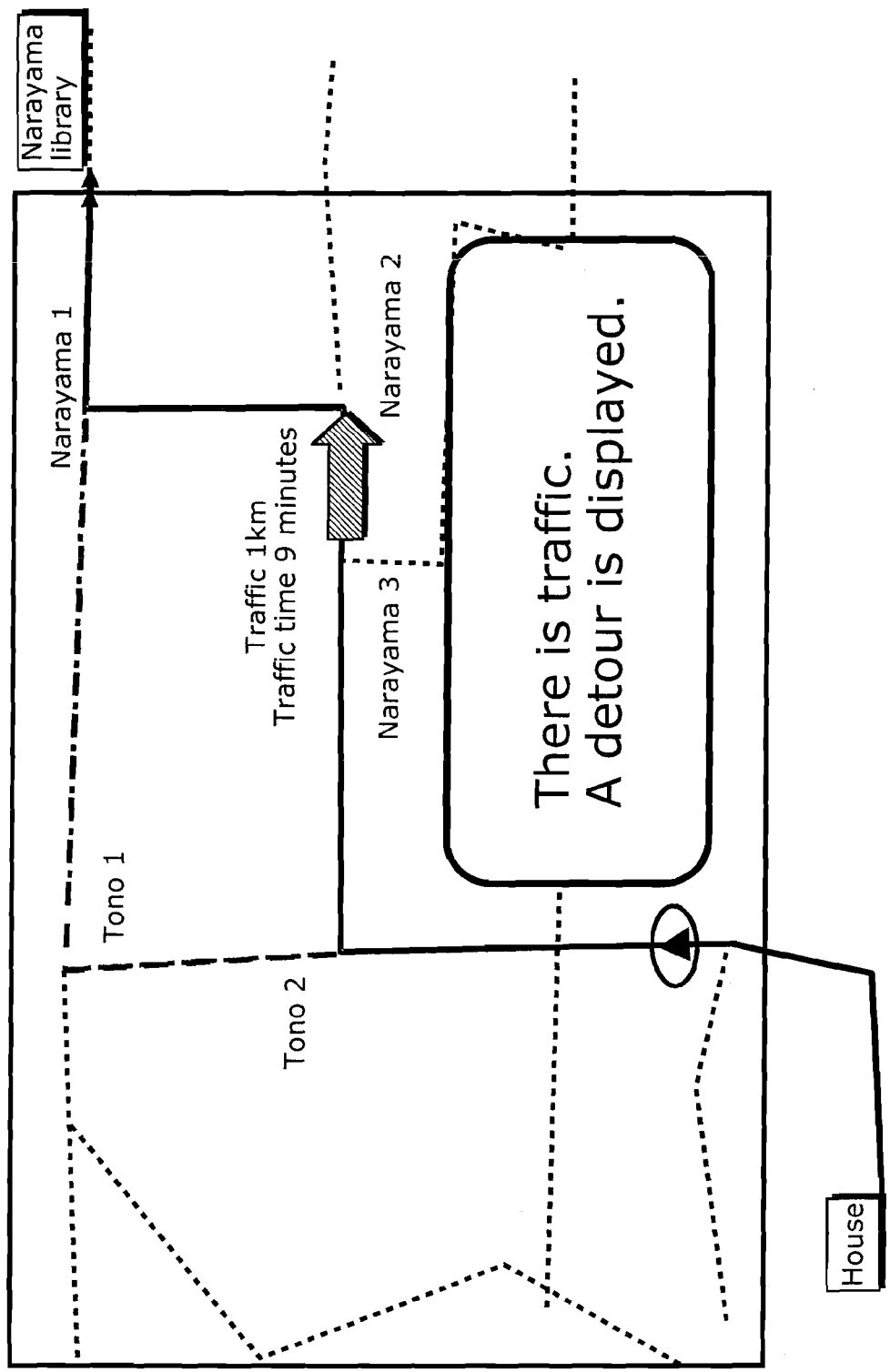
FIG. 23 is a diagram which shows an example of information provision.

FIG. 23 is a diagram which shows an example of information provision. FIG. 23 is a car navigation screen. Now, the user leaves the "House" and heads towards the "Narayama library". Here, there is traffic on the movement route between "Narayama 3" and "Narayama 2", which is acquired as transit event information. Here, when the traffic densities are compared, the traffic time is "9 minutes". A threshold value of the average traffic time "7 minutes" as mentioned above is stored in the transit information provision rule storage unit 109 and for example, since "9 minutes" is greater than the threshold value, a detour that passes through "Tono 2" and "Tono 1" is calculated and provided to the user.

Figure 24:
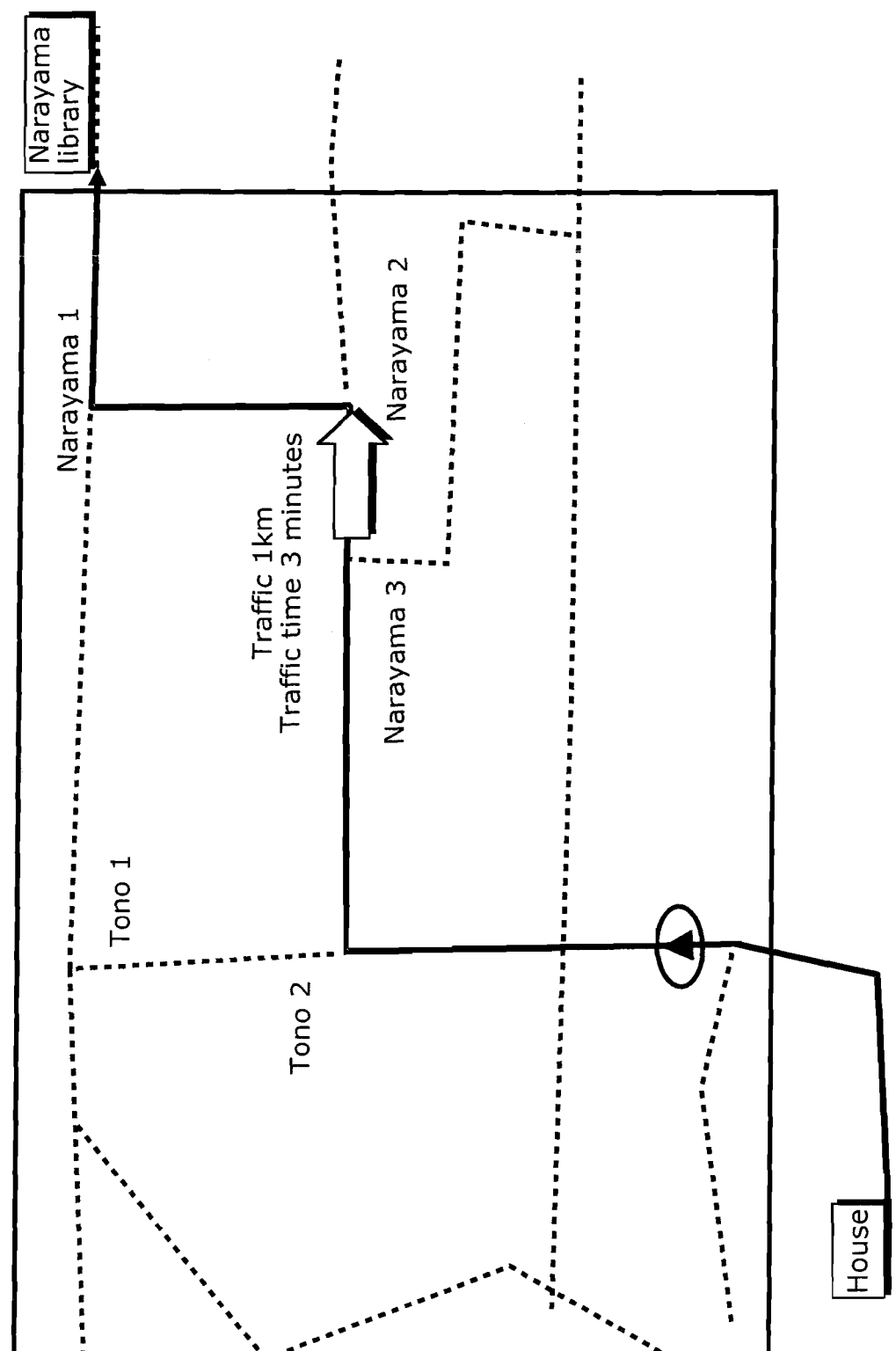
FIG. 24 is a diagram which shows another example of information provision.

FIG. 24 is a diagram which shows an example of information provision. The relationship between the user's situation and the geography is the same as in FIG. 23. However, the density of traffic between "Narayama 3" and "Narayama 2" in FIG. 24 differs. The traffic in FIG. 24 corresponds to a traffic time of "3 minutes". A threshold value of the average traffic time "7 minutes" is stored in the transit information provision rule storage unit 109 as mentioned above and since "3 minutes" is less than the threshold value, and since the density of traffic is not dense enough for the user to detour, the provision of a detour is not stopped.

In this way, depending on the user, the user will not necessarily utilize the alternative route even when there is traffic and the traffic density which requires information to be provided differs per user. For example, for users who will not use a detour and will advance without change when there is some traffic, automatic re-routing is unnecessary, and instead of automatically starting to reroute the user, traveling tasks are interfered with. Particularly for car navigation, it is preferable to stop unnecessary information provision in order to concentrate on traveling.

As shown in the present embodiment, an information provision model for the user is calculated using the provided traffic information and the user's movement history, and by controlling the provision of information according to the model, the transit information provision device can provide support for safe and comfortable traveling.

Below, the functions of the present invention are explained using the flowcharts in FIG. 25, FIG. 26 and FIG. 27. First, the functions in the present embodiment can be divided into three processes, the learning process, an information provision model calculation process, and a process for controlling the provision of information based on the calculated information provision model. Below, an example is described using the drawings.

Figure 25:
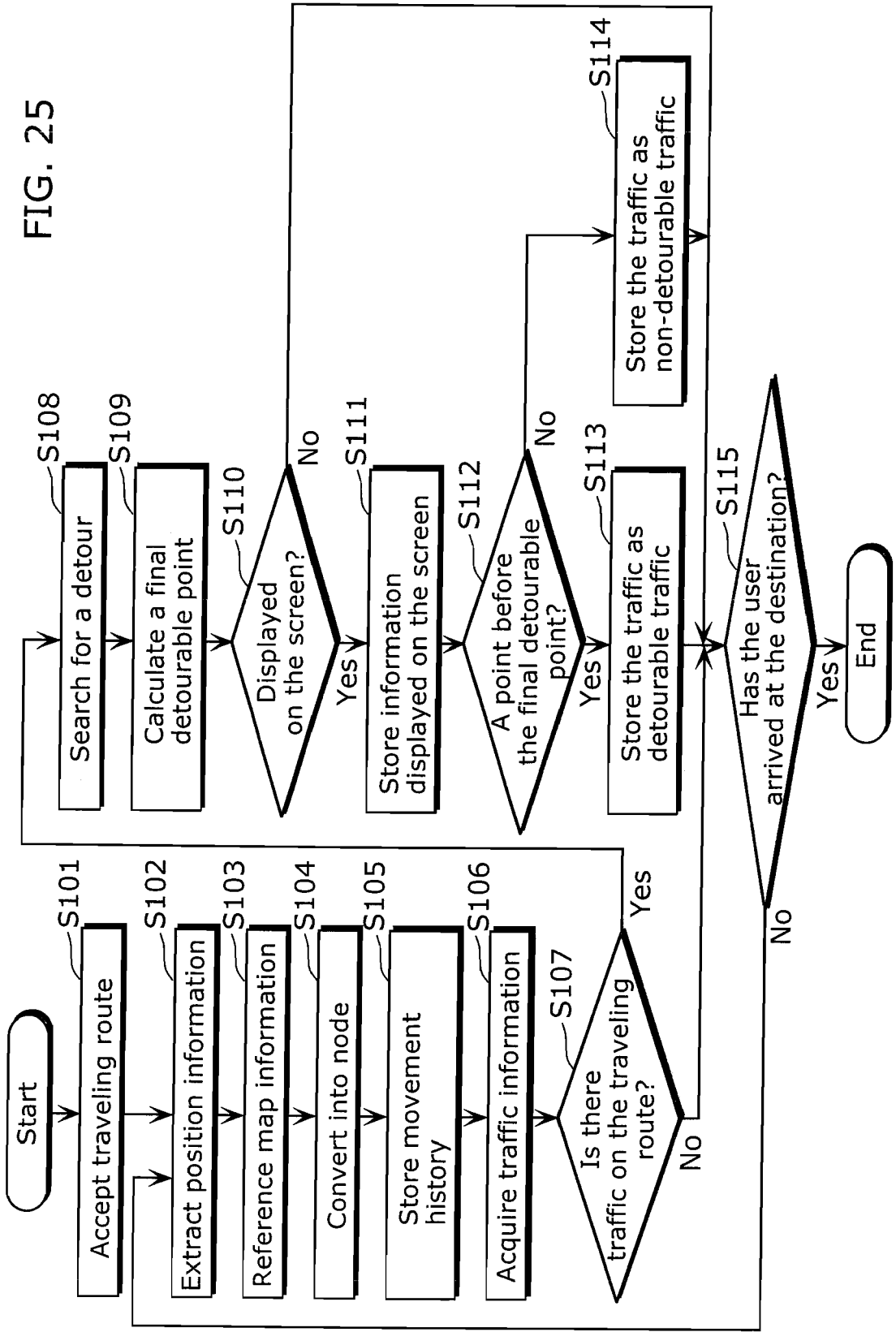
FIG. 25 is a flowchart which shows a learning process.

FIG. 25 is a flow which shows the learning process. First, a destination route is accepted by the route acceptance unit 106 (Step S101). Subsequently, position information is extracted by the position information extraction unit 110 (Step S102), the map information stored in the map information storage unit 112 is referenced and so on (Step S103), converted into a node (Step S104) and a movement history is stored in the movement history storage unit 111 (Step S105).

On the other hand, the traffic information is acquired by the transit event information acquiring unit 101 (Step S106). Note that the transit event information acquiring Step S106 need not necessarily be positioned after the series of steps which correspond to the abovementioned movement history storage (Steps S101 through S105) and may be processed in parallel. Subsequently it is judged whether or not there is traffic on the movement route (Step S107). When there is no traffic, the process progresses to S115. Subsequently, it is judged whether or not the user has arrived at the destination (Step S115) and when the user has arrived (Yes in Step S115), the process finishes, and when the user has not arrived (No in Step S115), the process returns to Step S102 and repeats the position information extraction and so on (Step S102).

On the other hand, when there is traffic information (Yes in Step S107), the process proceeds to judge whether or not the user has traveled to avoid the traffic by the detour traveling judgment unit 107. First, a detour is searched by the detour searching unit 105 (Step S108), and a final detourable point is calculated from the movement route and the detour by the detour traveling judgment unit 107 (Step S109).

Subsequently it is judged whether or not the traffic is displayed on the screen of the transit information provision unit 103 (Step S110). When the traffic is displayed (Yes in Step S110), the information displayed on the screen is stored in the information provision format storage unit 104. Thus, it can be estimated that the user recognizes the traffic. On the other hand, when the traffic is not displayed (No in Step S110), the process progresses to Step S115.

Next, it is judged whether or not the position of the user when the traffic is displayed is before the final detourable point (Step S112). When the user's position is before the final detourable point (Yes in Step S112), the traffic is stored as detourable traffic in an information recognition history (Step S113). On the other hand, when the traffic is not displayed before the final detourable point (No in Step S112), information about the traffic is stored as traffic which cannot be detoured (Step S114).

Subsequently, it is judged whether or not the user has arrived at the destination (Step S115). When the user has arrived at the destination (Yes in Step S115), the information provision format which is the learning process and the movement history storage finishes. On the other hand, when the user has not arrived at the destination (No in Step S115), the process returns to Step S102, and the information provision format and movement history storage processes are repeated.

Figure 26:
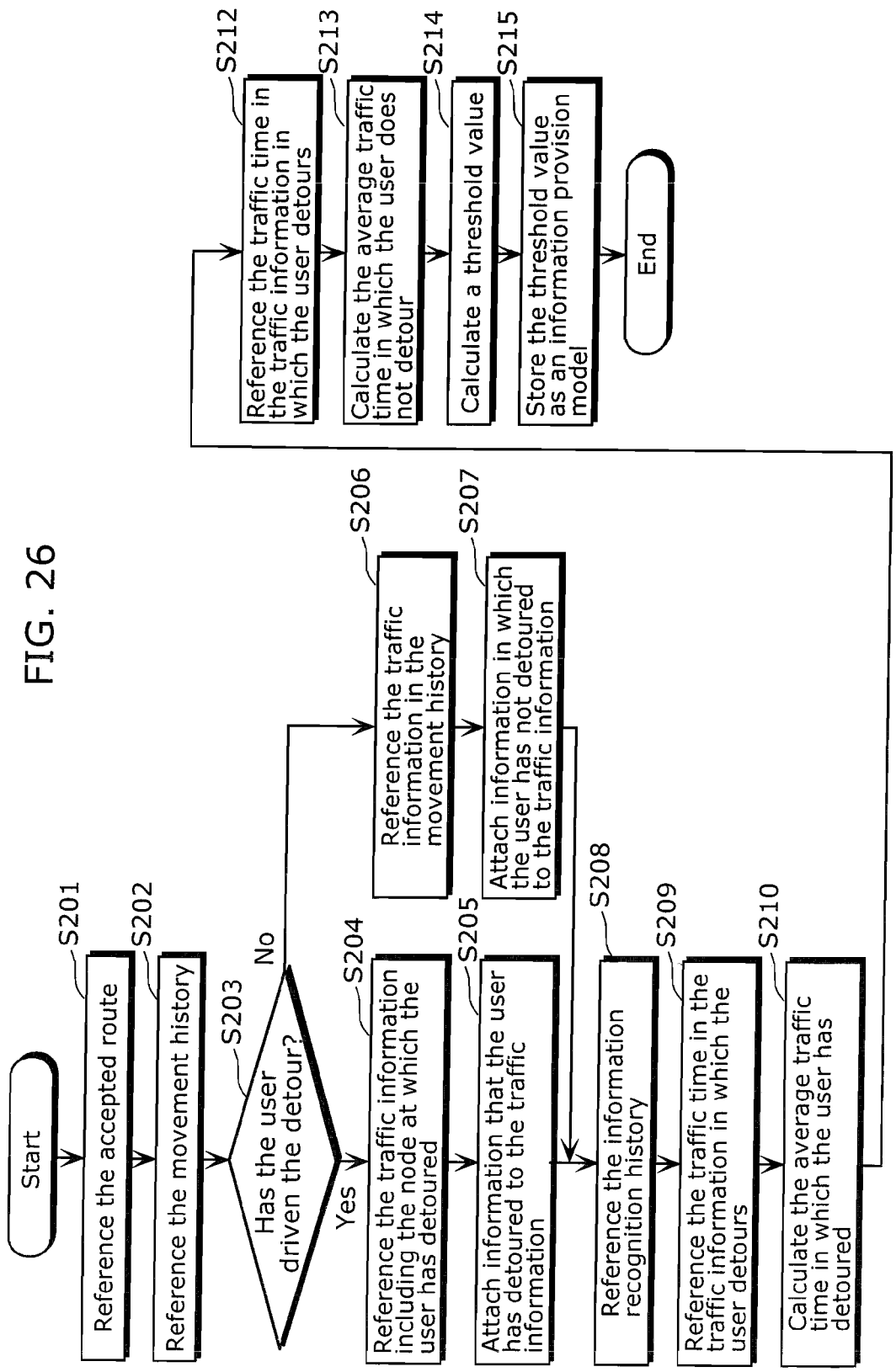
FIG. 26 is a flowchart which shows an information provision model calculation process.

Next, the calculation process of the information provision model is described using the flowchart in FIG. 26. First, the information recognition history stored by the flow shown in FIG. 25 described above is stored by the information recognition history unit 13. More specifically, as shown in FIG. 17, information is stored which indicates that the traffic is displayed before the final detourable point and that it is estimated that the user has recognized the traffic. Additionally, the movement history is stored in the movement history storage unit 111 as shown in FIG. 7 and FIG. 9. Here, the information provision model is calculated by the transit information providing rule calculation unit 108 using the above information.

First, the accepted route is referenced by the route acceptance unit 106 (Step S201). Additionally, the movement history stored by the movement history storage unit 111 is referenced (Step S202). By matching the movement histories, it is judged whether or not the user has detoured (Step S203). When the user has detoured (Yes in Step S203), the traffic information including the node at which the user has detoured is referenced (Step S204) and information is added to the traffic information which indicates that the user has detoured (Step S205).

More specifically, as shown in FIG. 19 (a) and (b), it is judged whether the user has detoured from the route "N24" to "N25" to travel the route "N28" to "N27" by matching the accepted route and the movement history which is a record of the user's actual traveling (Yes in Step S203). Subsequently, a flag is attached (shown by a circle in the present embodiment) to the "detoured history" (Step S205) by referencing the traffic information which includes the node at which the user has detoured (Step S204).

On the other hand, when the user has not detoured (No in Step S203), the traffic information in the movement history is referenced (Step S206) and information is added to the traffic information which indicates that the user has not detoured (Step S207).

More specifically, as shown in FIG. 20 (a) and (b), it is judged that the user has traveled along the accepted route by matching the accepted route and the movement history which is a record of the user's actual traveling (No in Step S203). Subsequently, a flag is attached (shown by a circle in the present embodiment) to the "detoured history" (Step S207) by referencing the traffic information in the movement history (Step S206). Note that the movement history is again stored in the information recognition history storage unit 113.

Next, an information provision model is calculated by the transit information providing rule calculation unit 108 from the information recognition history acquired in this way. First, the information recognition history is referenced (Step S208). For example, FIG. 21 is an example of the information recognition history. Subsequently, the traffic time in the traffic information when the user has detoured is referenced (Step S209), in order to calculate the average traffic time (Step S210). The average traffic time "10 minutes" is calculated when the user has detoured, as shown in the abovementioned FIG. 22.

On the other hand, the traffic time in the traffic information when the user has not detoured is referenced (Step S212) in order to calculate the average traffic time (Step S213). The average traffic time "4 minutes" is calculated when the user has not detoured as shown in the abovementioned FIG. 22.

Subsequently, a threshold value is calculated (Step S214). For example, a median of the average values "7 minutes" is calculated as shown in the abovementioned FIG. 22. Subsequently the median is stored as a calculated information provision model in the transit information provision rule storage unit 109 (Step S215).

Figure 27:
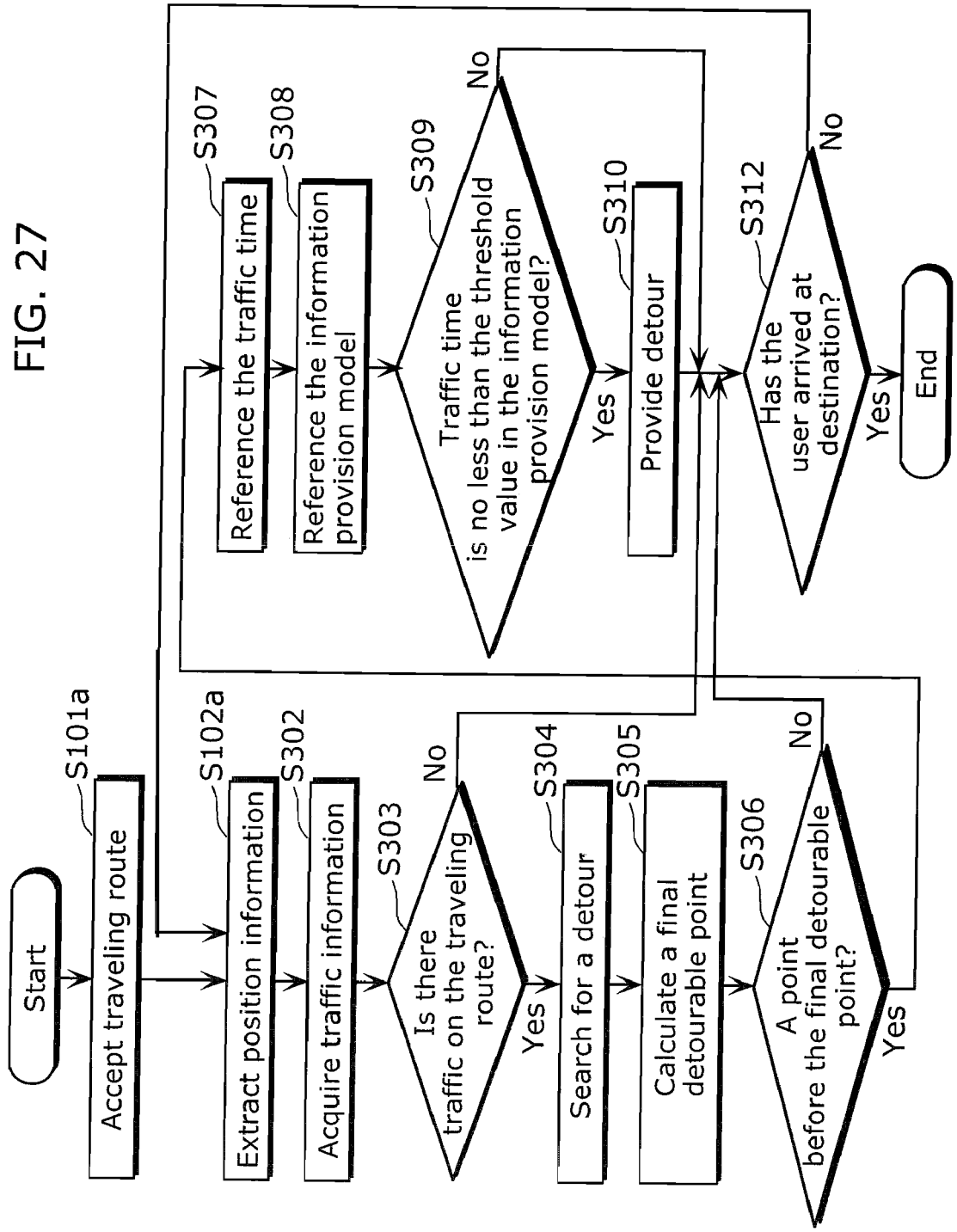
FIG. 27 is a flowchart which shows an information provision control process.

Next, functions for controlling the information provision using the information provision model acquired by the flow above is described using the flowchart in FIG. 27.

The functional flow describing the information provision control is performed in parallel with the functions of the learning process in the abovementioned FIG. 25. Accordingly, a part of the functional step is shared by the function flow in the learning process. First, a destination route is accepted by the route acceptance unit 106 (Step 101a). Subsequently, the position information is extracted by the position information extraction unit 110 (Step S102a).

Subsequently, the learning process shown in FIG. 25 progreses to a flow in which the movement history is stored (from Step S103 to Step S105 and so on). In the information providing control function, the traffic information is acquired by the transit event information acquiring unit 101 (Step S302). Subsequently it is judged whether or not there is traffic on the movement route (Step S303). When there is no traffic, the process progresses to S312. Subsequently, it is judged whether or not the user has arrived at the destination (Step S312) and when the user has arrived (Yes in Step S312), the process finishes; when the user has not arrived (No in Step S312), the process returns to Step S102a and repeats the steps after position information extraction.

On the other hand, when there is traffic information (Yes in Step S303), provision of information related to traffic information is controlled by referencing the information provision model. First, a detour is searched for by the detour searching unit 105 (Step S304), and a final detourable point is calculated from the movement route and the detour by the detour traveling judgment unit 107 (Step S305). Next, it is judged whether or not the position of the user is before the final detourable point (Step S306). When the position of the user is before the final detourable point (Yes in Step S306), the process proceeds to Step S307 and when the position of the user is after the final detourable point (No in Step S306) the process proceeds to Step S312.

When the position of the user is before the final detourable point (Yes in Step S306), the information provision model is referenced (Step S308) by referencing the traffic time in the acquired traffic information (Step S307). Subsequently it is judged whether or not the traffic time is greater than the threshold value of the information provision model (Step S309). Only when the traffic time is above the threshold value, a detour is provided (Step S310). Subsequently, it is judged whether or not the user has arrived at the destination (Step S312) and when the user has not arrived (No in Step S312), the process returns to Step S102a and the functions are repeated.

(Modification 1)

Up until this point, an example of the calculation of the average traffic time at which traffic information is provided or not has been described based on the traffic time in the traffic provision format history. According to this structure, since the user does not need to set the traffic level for displaying a detour beforehand, only a detour estimated to be necessary according to the user's detour history is provided and thus information is provided comfortably without confusing the user.

However, there are times when the density of traffic tolerated by the same user will differ for each traffic point, as mentioned in the Problems. Thus, an information provision model may be calculated for each point. Below, an example is described using FIG. 28 and FIG. 29.

FIG. 28 is a diagram which shows the movement and so on of a user at a specific position. In FIG. 28, the user's route departing from the "House" to the "Golf course" is shown with a bold black line. Subsequently, there is traffic on the route between the "Kyo 2" and "Kyo 3" intersections with a traffic distance of "1 km" and a traffic time of "3 minutes", and the traffic is acquired. For example, in the above example, the user's information provision model is an information provision format history in which a threshold value of "7 minutes" is calculated based on the traffic time at all points, however there are times when the user's choice to detour or not depends on the user and on each traffic point. For example, at this point, the user shown in the present example will tend to detour even when there is a little traffic. In this case, it is ideal for the detour to be provided automatically, even when there is traffic with a traffic time of "3 minutes". Thus, the provision of information may be controlled by a threshold value calculated based on whether or not the user detours at each point.

FIG. 29 is a diagram which shows the user's information recognition history shown in the present example. In the same way as FIG. 21 and the like, information about each traffic point and information about whether or not the user subsequently detoured based on the movement history is stored (the detour history shown by a circle mark and the like). Additionally, only information from the traffic points N42 (Kyo 2) to N43 (Kyo 3) is illustrated. For example, in the traffic ID "080" there is traffic with a traffic time of "3 minutes" from the traffic points "N42 (Kyo 2) to N43 (Kyo 3)", and the detour history is "O", in other words information that the user has detoured is stored. In the same way, there is traffic with a traffic time of "2 minutes" at the same point as the traffic ID "083" and information that the user has detoured at the traffic point is stored. On the other hand, in the traffic ID "093", when there is no traffic and conditions are normal, information that the user passed through the traffic point without detouring is stored. In other words, when there is no traffic and conditions are normal, the traffic ID shows a tendency that the user will detour when there is traffic of as little as 2 or 3 minutes. Thus, an information provision model may be calculated by calculating an average time and referencing the information recognition history which is the user's movement after the traffic information is provided at each traffic point.

The traffic density acquired from the VICS link is an average speed and distance, for example "1 km of traffic" is acquired the same as 1 km of traffic at any point. However, although the "1 km of traffic" is the same, there are many cases where the user will feel that the traffic density differs by the traffic point. For example, there are cases where a user that is not used to traveling must use a narrow road to detour around traffic, must turn right at an intersection with a lot of traffic or does not utilize a detour even when there is little traffic. However, even for detouring at a place that is easily detourable, the density of traffic which the user can tolerate varies for each point, even for the same user. Thus, by calculating an information provision model according to each point as shown above, the user can control information provision without any complicated commands such that only information that is necessary is provided at necessary times, and the user can travel comfortably.

(Modification 2)

Generally, traffic and so on can vary greatly according to the time period and the user's movement also varies according to the time period. For example, for a user who uses a vehicle to go to work on a weekday morning, the user will need to detour even when there is only a little traffic in order not to be late to work. However, there is more time at the same point on a holiday, and even when there is a little traffic, the user may use the route without changes and thus the traffic density that the user can tolerate varies according to the day of the week and the time period. Thus, the information recognition history and the movement history are referenced as shown above for each holiday or each weekday, and further each time period in the morning, afternoon and night and so on and the information provision model may be calculated for each holiday and each weekday. Thus, information can be provided according to the movement tendencies of the user depending on the time period.

(Modification 3)

Note that in the present embodiment, the information recognition judgment unit 1131 judges whether or not the user has recognized the traffic when the traffic information is provided using information that indicates whether or not the traffic information is displayed on the screen. When displayed on the screen, it can be estimated that the user recognizes the traffic and by referencing the user's subsequent movements, and it can be judged whether or not the user recognized the traffic and passed through the traffic point or whether or not the user detoured to avoid traffic. However, the judgment of whether or not the user has recognized the traffic is not limited to this basis. For example, the user may recognize the traffic when the screen is scrolled or when audio is provided. Below, an example is described using the drawings.

Figure 30:
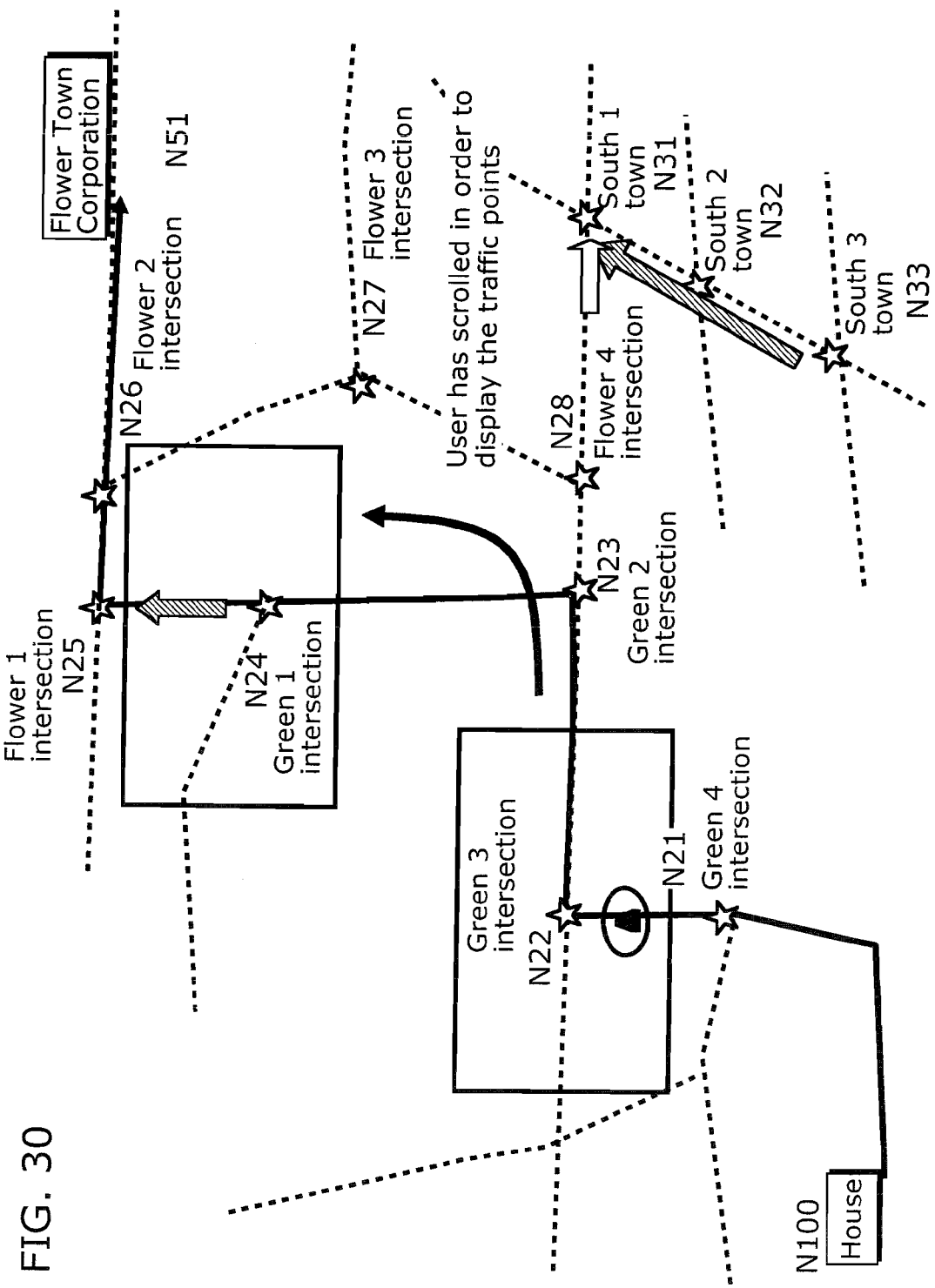
FIG. 30 is a diagram which explains recognition of traffic by the user.

FIG. 30 is a diagram which describes the user recognizing traffic. In FIG. 30, a route is shown in which the user leaves the "House" and heads to the "Flower Town Corporation" in the same situation as FIG. 12. Additionally, there is traffic on the route between the "Green 1" and "Flower 1" intersections. The user is presently positioned at a point before the "Green 3" intersection. The display screen shown in FIG. 12 is a wide display which displays a wide area of the map in which the traffic points are displayed and it can be estimated that the user ascertains the traffic just before the "Green 2" intersection which is the final detourable point. Elsewhere in FIG. 30, since the screen is a "detailed display" which shows the details of the map, the traffic points cannot be displayed at the present position and therefore it cannot be estimated that the user has recognized the traffic.

However, the user shown in the present example scrolls the screen while the vehicle is stopped at the "Green 3" intersection and displays the traffic points for confirmation. In this case, it can be judged that the user has recognized the traffic even when the traffic is not yet displayed on the screen displaying the present position since the user has scrolled the screen in order to display the traffic on the screen. Thus it can be judged whether or not the user has detoured by referencing the history of actions undertaken by the user.

Figure 31:
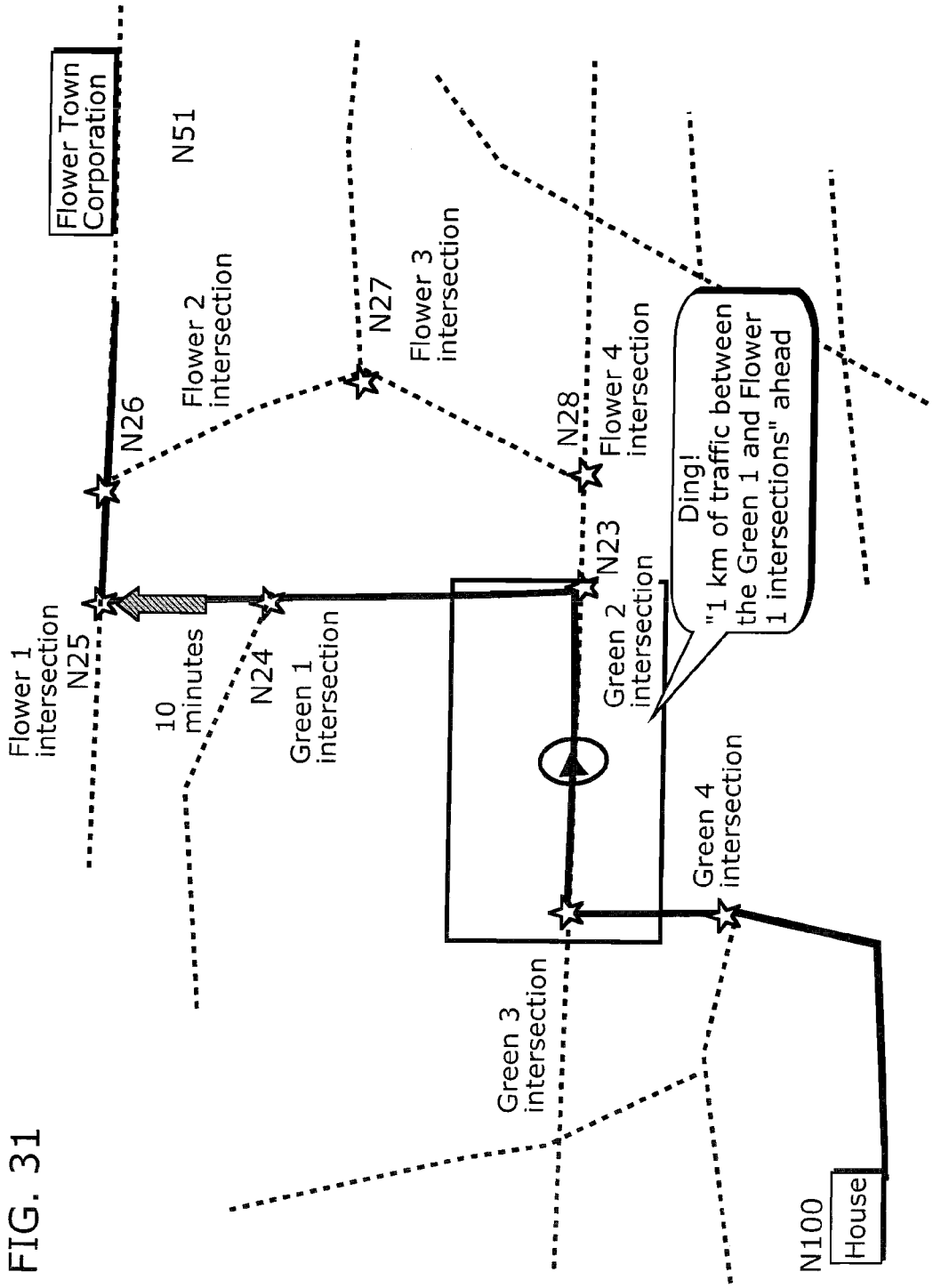
FIG. 31 is a diagram which describes recognition of traffic by the user.

FIG. 31 is a diagram which describes the user recognizing traffic in the same situation as FIG. 30. The screen in FIG. 31 is a detailed display and thus the user cannot ascertain that there is traffic before the "Green 2" intersection which is the final detourable point. However, it is communicated to the user that there is traffic between the "Green 1" and "Flower 1" intersections. Accordingly, before the user passes through the final detourable point, it can be estimated that the user has recognized the traffic. In this way, the judgment of whether or not the user has recognized the traffic may be performed using information related to the function performed by the user not only the information displayed on the screen and its mode. A more flexible information provision model can be calculated.

When traffic information has been provided by the user scrolling the screen or by audio from the device, it is more likely that the user has recognized the traffic information than when the traffic information is displayed on the display screen which simply displays the area around the present position of the user. For example, when it seems that traffic is not simply displayed on the screen but the user has intentionally scrolled the screen in order to confirm traffic information, the information becomes more reliable since the subsequent movement has been taken after the user recognizes the confirmed traffic point. Thus, reliability value information is inserted in the information providing format and depending on how the traffic has been recognized, the reliability value is changed depending on how the traffic has been recognized, and the information may be utilized in the calculation of an information provision model.

FIG. 32 is a diagram which shows the information recognition history. In addition to the information recognition history shown in FIG. 21 and so on, a reliablity value calculated based on the mode of provision is added to the information providing format shown in FIG. 32. For example when traffic is displayed on the screen and recognized by the user, the display time is important. Since the information displayed for a long period on the screen has more likelihood of being recognized by the user, the reliability value according to the display time (seconds) is for example added. Traffic for which the screen has been scrolled and which seems to have been confirmed has a higher reliability value and for example, "1.0 (MAX)" is added to the display. For audio, since the user has not necessarily recognized the audio, a reliability value is added which varies according to the mode, such as "0.5".

Generally, the likelihood of recognition by the user varies even with the same screen display, when the arrow that displays the traffic is red and blinking and when only the traffic points are displayed. Or, the likelihood of recognition by the user varies when the traffic is displayed on the map with just an arrow and when other traffic information is provided as a simple map apart from the map. Further, even when the screen display time is the same, the user's degree of recognition varies for time displayed while the vehicle is stopped such as when waiting for a signal, and for time displayed according to the present position display while traveling. Additionally, even when the same audio is provided, the user is playing music and so on, the user may miss the audio and the possibility that the user recognizes the information is low. In this way, the user's degree of recognition may further be calculated in consideration of the mode of traffic information provision, the situation of the user and so on.

For example in FIG. 32, a reliability value of "0.2" is attached to the traffic ID "001" since the traffic ID "001" is "Screen display" and the display time is "200 seconds". On the other hand, a reliability value of "1.0" is added to the traffic ID "018" since the user has chosen to "scroll" the display. On the other hand, a reliability value of "0.5" is added to the traffic ID "019" since the user has chosen "audio" to be provided. In this way, the information provision model is calculated using a reliability value which is a calculated certainty of recognition.

The calculation method shown in the above FIG. 21, 22 and so on is calculated on the basis that the user has recognized the information provided or not with the frequency of each information provision format as "1", however by weighing the reliability and calculating the average time, an information provision model that takes into consideration the reliability value can be calculated.

(Modification 4)

Additionally, the information provision model may be calculated by taking into account the traveling time heretofor. For example, when a user is engaged in recreation such as returning home or skiing, the traveler may be somewhat tired even when the traveler has been taking breaks while traveling. In this case, when there is traffic, the information provision model calculated as the user's traffic toleration, in other words the average traffic time, decreases and the user may be encouraged to travel more comfortably by providing detours even when there is little traffic. Even for a user who travels when there is normally a little traffic, when the user has been traveling for a long time, often the user will not want to get caught in more traffic. In this case, by providing the traffic information and the detour, the user can be encouraged to travel more safely.

(Modification 5)

Methods for predicting the movement destination of a user are well known. Thus in the present invention, the movement destination of the user may be predicted from the movement history using such a well known method and by inputting the predicted movement destination into the route acceptance unit 106.

Without inputting the movement destination by hand, prediction is often assigned to the device when the traveler is traveling on a familiar route such as the route to work. In this case, many times the user will play music and so on and not display the user's present position. In this case, since the user cannot know that there is traffic on the movement route, it is preferable that the traffic is notified to the user and a detour is searched for.

However, as mentioned above, the density of traffic that can be tolerated depends on the user and it is important that an appropriate amount of information is provided according to the user.

Accordingly, an information provision model as shown in the present invention is calculated and a method for controlling provision of transit information such as the detour according to the information provision model is an extremely effective method for car navigation which predicts the user's movement destination and provides information automatically.

(Minimal Structure)

Figure 33:
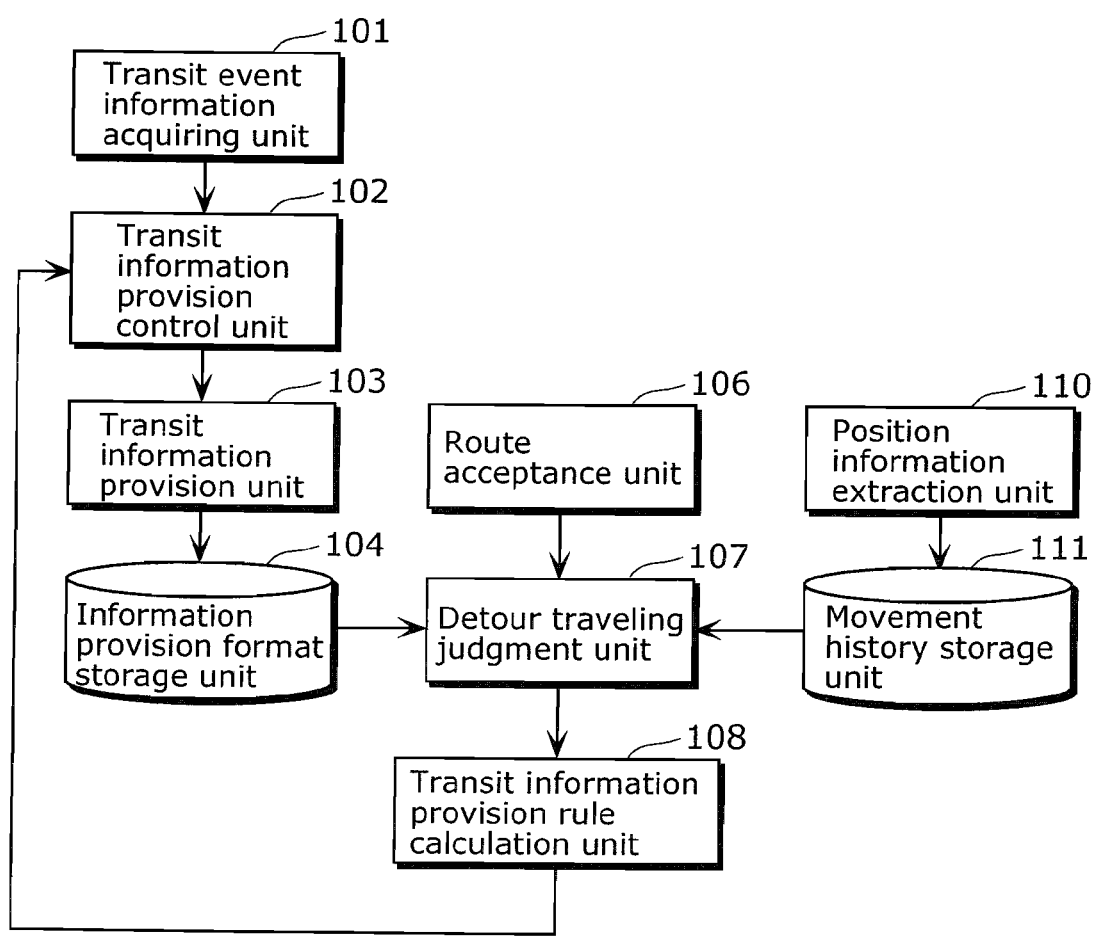
FIG. 33 is a diagram which shows the minimum structure for realizing the present invention.

Note that the storage of movement history in the present embodiment has been performed by converting information into a node sequence by referencing the map information and taking into consideration the ease of route matching, however since, for example, longitude and lattitude information that has been extracted by the position information extraction unit 110 such as a GPS can also be stored the movement information storage unit is not necessarily a necessary constituent element. Accordingly, the invention shown in the present embodiment can be realized by the constituent elements shown in FIG. 33.

In other words, the minimal structure for realizing the present invention is a transit information provision device which provides transit information related to transit, a transit event information acquiring unit 101 which acquires transit event information which expresses a transit-related event; a transit information provision unit 103 which provides the transit information to a user, the transit information relating to transit event information; an information provision format storage unit 104 which stores the transit information provided by the transit information provision unit; a position information extraction unit 110 which successively extracts position information which indicates a present position of the user; a movement history storage unit 111 which stores a sequence of the extracted position information as a movement history; a route acceptance unit 106 which accepts an anticipated movement route for the user; a detour traveling judgment unit 107 which judges whether or not the user has traveled along the anticipated movement route, based on an information recognition history stored in the information recognition history storage unit 113 and the movement history stored by the movement history storage unit 111; a transit information provision rule calculation unit 108 which calculates a rule for providing the transit information using transit event information about the case in which it is judged by the detour traveling judgment unit 107 that the user has traveled along the anticipated movement route, and transit event information about the case in which the user is judged to have detoured by the detour traveling judgment unit 107; and an information provision control unit 102 which, when new transit event information is acquired, controls the provision of transit information related to the new transit event information by the transit information provision unit 103, based on the rule.

(Example of Minimal Structure)

Figure 34:
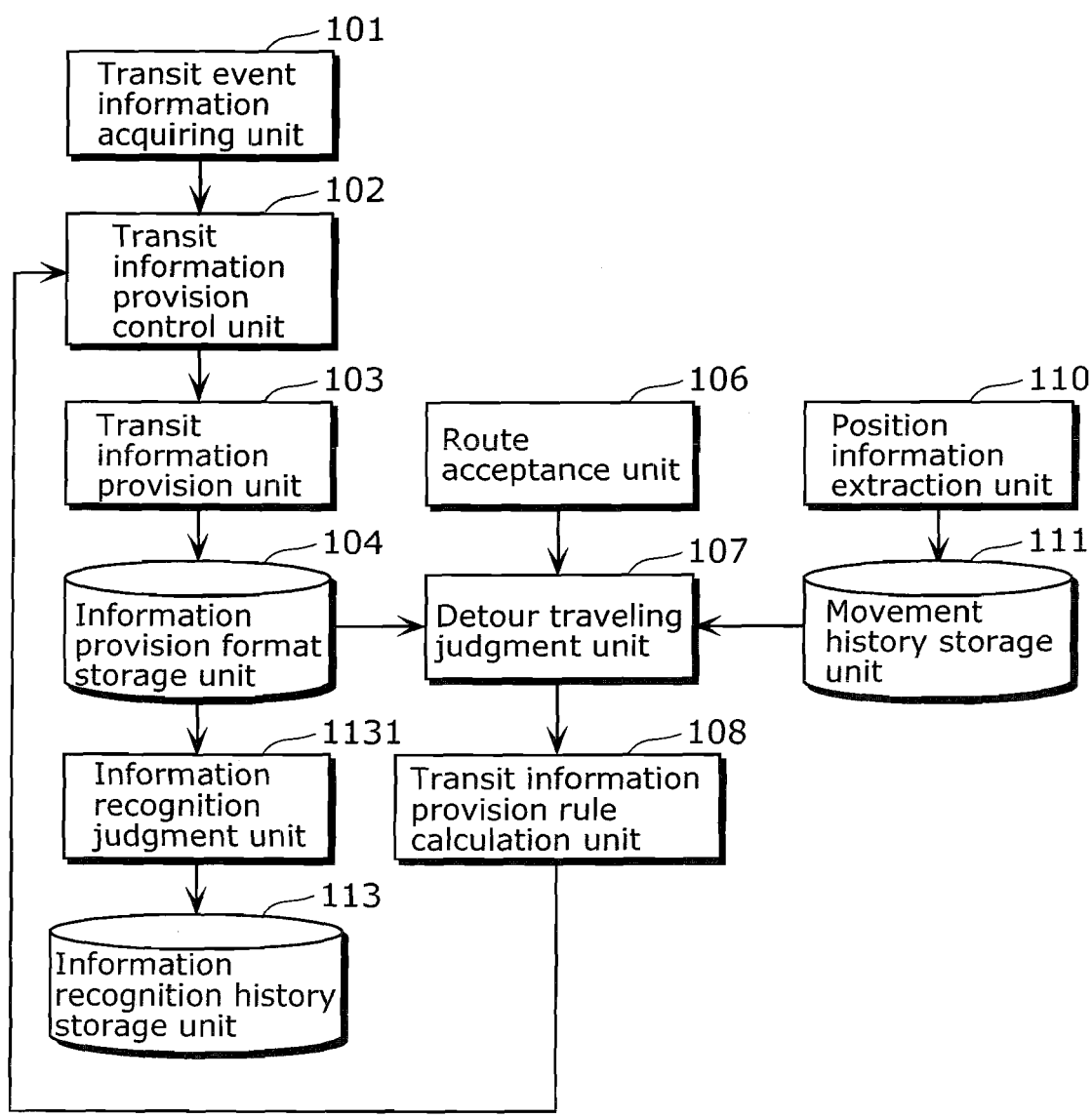
FIG. 34 is a diagram which shows another example of the minimum structure for realizing the present invention.
Figure 35:
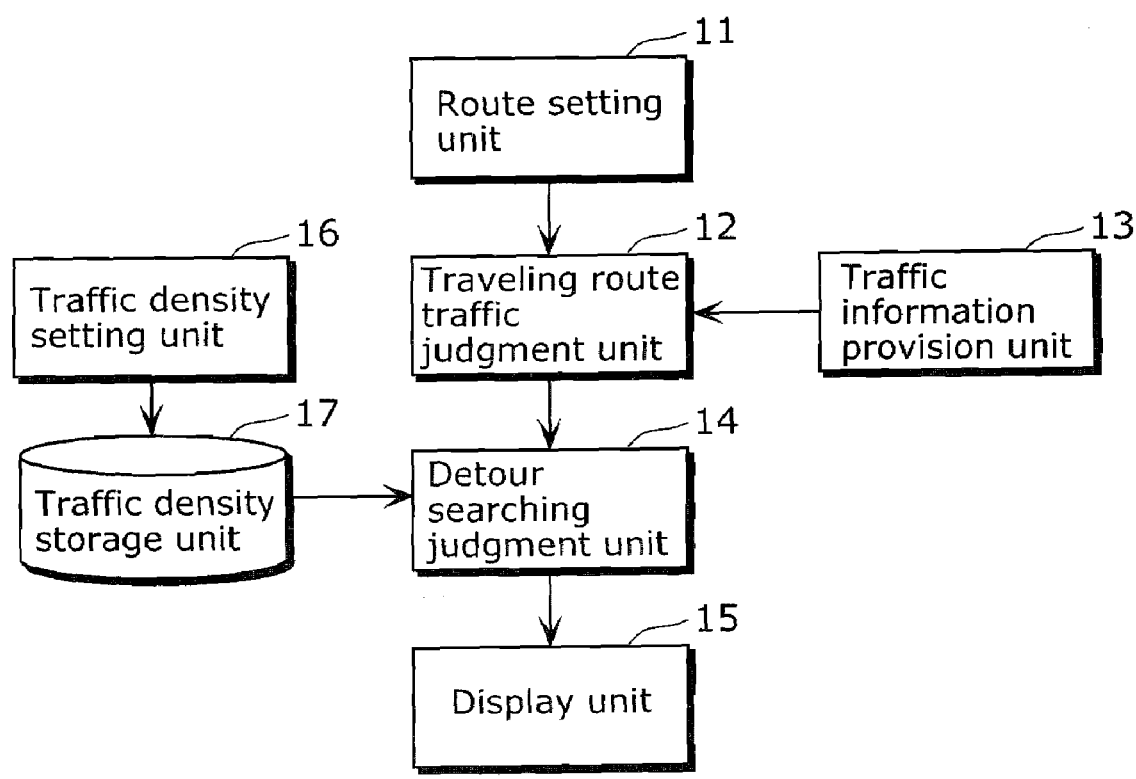
FIG. 35 is a diagram which shows an example of the structure of a conventional transit transit information provision device.

Also, in the present embodiment, the judgment of the user's likelihood of recognition for traffic is performed based on whether or not the traffic is displayed on the display screen and so on, however for example information can be stored by including a recognition judgment unit which performs a judgment related to other recognition, and another example structure can be thought of which uses the information providing model calculation. Accordingly, the invention shown in the present embodiment can be realized by the constituent elements shown in FIG. 34.

In other words, another example of the minimal structure necessary for realizing the present invention is composed of an information recognition judgment unit 1131 which judges the likelihood of recognition by the user of the provided information stored by the information provision format storage unit 104, and an information recognition history storage unit 113 which stores the degree of recognition judged by the information recognition judgment unit 1131.

INDUSTRIAL APPLICABILITY

The present invention is a device which provides information related to transit, and for example may include a car navigation device or a cellular terminal device, and calculates a rule for providing information based on provided transit event information and can be used as an information provision device is which provides necessary information to the user by providing information according to the rule.

What is claimed is:

1. A transit information provision device which provides transit information, said transit information provision device comprising:
    a transit event information acquiring unit operable to acquire transit event information which expresses a transit-related event;
    a transit information provision unit operable to provide the transit information to a user, the transit information relating to the transit event information;
    an information provision format storage unit operable to store the transit information provided by said transit information provision unit and a provided location which expresses a traveling point at which the transit information is provided by said transit information provision unit;
    a position information extraction unit operable to successively extract position information which indicates a present position of the user;
    a movement history storage unit operable to store a sequence of the extracted position information as a movement history;
    a route acceptance unit operable to accept an anticipated movement route for the user;
    a detourable point calculation unit operable to calculate a detourable point where the anticipated movement route accepted by said route acceptance unit is avoided, based on the transit information and the provided location stored by said information provision format storage unit and the anticipated movement route;
    an information recognition judgment unit operable to judge a likelihood of recognition, the likelihood of recognition being a degree of certainty of recognition by the user of the transit information stored by said information provision format storage unit;
    an information recognition history storage unit operable to store the likelihood of recognition judged by said information recognition judgment unit;
    a detour traveling judgment unit operable to judge whether the user has intentionally followed the anticipated movement route or intentionally detoured, using the likelihood of recognition stored by said information recognition history storage unit, based on the provided transit information stored by said information provision format storage unit and the movement history stored by said movement history storage unit, and judge that the user has intentionally detoured from the anticipated movement route when the provided location stored by said information provision format storage unit is before the detourable point calculated by said detourable point calculation unit;
    a transit information provision rule calculation unit operable to calculate a rule for providing the transit information using transit event information about the case in which it is judged by said detour traveling judgment unit that the user has intentionally followed the anticipated movement route, and transit event information about the case in which the user is judged to have intentionally detoured by said detour traveling judgment unit; and
    an information provision control unit operable to, when new transit event information is acquired, control the provision of transit information related to the new transit event information by said transit information provision unit, based on the rule.

2. The transit information provision device according to claim 1,
    wherein transit event information indicates at least one of a degree, a length, a time and a speed related to traffic, which express a density of the traffic,
    the transit information is traffic information which relates to the traffic,
    said traffic information rule calculation unit is operable to calculate a threshold value as the rule which determines whether or not to provide information, and
    said information provision control unit is operable to stop the provision of traffic information related to the new transit event information by said transit information provision unit when new transit event information is acquired and the degree, length, time or speed, which are expressed by the new transit event information and which express the density of the traffic, are less than the threshold value.

3. The transit information provision device according to claim 2,
wherein said transit event information further expresses a location where there is traffic, and
said traffic information rule calculation unit is operable to calculate an independent rule for each piece of transit information respectively expressing different positions.

4. The transit information provision device according to claim 1,
wherein said information provision format storage unit is further operable to store mode information which expresses a mode in which the transit information is provided by said transit information provision unit, and a reliability value representing the degree of certainty of recognition by the user of the transit information according to the mode, and
said transit information provision rule calculation unit is operable to calculate the rule by assigning weights to when it is judged that the user has traveled intentionally on the anticipated movement route and when it is judged that the user has intentionally detoured using the reliability value and the weighted transit event information.

5. The transit information provision device according to claim 4,
wherein said information provision unit is made up of a display unit operable to display the transit information on the screen, and
the mode information is information which includes at least one of a display position, a display time, a display timing and whether or not the user has scrolled the screen, which are displayed by said display unit.

6. The transit information provision device according to claim 4,
wherein said information provision unit is made up of an audio provision unit which is operable to provide the transit information in audio, and the mode information is information which includes at least one of a provided location, a provided time and a provided timing, which are provided by said audio provision unit.

7. The transit information provision device according to claim 1, further comprising
a movement destination prediction unit operable to predict a future movement route based on the present position information extracted from the movement history and said position information extraction unit,
wherein said route acceptance unit is operable to designate the future movement route predicted by said movement destination prediction unit as the accepted route.

8. A method for providing transit information to a user, comprising:
acquiring transit event information which expresses a transit-related event;
providing the transit information to a user, the transit information relating to the transit event information;
storing the transit information provided in said providing and a provided location which expresses a traveling point at which the transit information is provided in said providing;
successively extracting position information which indicates a present position of the user;
storing a sequence of the extracted position information as a movement history;
accepting an anticipated movement route for the user;
calculating a detourable point where the anticipated movement route accepted in said accepting is avoided, based on the transit information and the provided location stored in said storing of the transit information and the anticipated movement route;
judging, using a computer, a likelihood of recognition, the likelihood of recognition being a degree of certainty of recognition by the user of the transit information stored in said storing of the transit information;
storing the likelihood of recognition judged in said judging of a likelihood;
judging whether the user has intentionally followed the anticipated movement route or intentionally detoured, using the likelihood of recognition stored in said storing of the likelihood, based on the provided transit information stored in said storing of the transit information and the movement history stored in said storing of a sequence, and judging that the user has intentionally detoured from the anticipated movement route when the provided location stored in said storing of the transit information is before the detourable point calculated in said calculating;
calculating a rule for providing the transit information using transit event information about the case in which it is judged in said judging of whether the user has intentionally followed the anticipated movement route or intentionally detoured that the user has intentionally followed the anticipated movement route, and transit event information about the case in which the user is judged to have intentionally detoured in said judging of whether the user has intentionally followed the anticipated movement route or intentionally detoured; and
controlling, when new transit event information is acquired, the provision of transit information related to the new transit event information in said providing, based on the rule.

9. A computer program product, which, when stored onto a non-transitory computer readable medium, allows the computer to execute the transit information provision method according to claim 8.

* * * * *